US00RE37367B1

(19) United States
(12) Reissued Patent
Wachi et al.

(10) Patent Number: US RE37,367 E
(45) Date of Reissued Patent: Sep. 18, 2001

(54) COMPUTERIZED MUSIC SYSTEM HAVING SOFTWARE AND HARDWARE SOUND SOURCES

(75) Inventors: Masatada Wachi; Hideo Yamada; Masashi Hirano, all of Hamamatsu (JP)

(73) Assignee: Yamaha Corporation (JP)

(21) Appl. No.: 09/353,579

(22) Filed: Jul. 14, 1999

Related U.S. Patent Documents

Reissue of:
(64) Patent No.: 5,714,703
Issued: Feb. 3, 1998
Appl. No.: 08/659,011
Filed: Jun. 4, 1996

(30) Foreign Application Priority Data

Jun. 6, 1995 (JP) ..... 7-139526
Sep. 29, 1995 (JP) ..... 7-253493

(51) Int. Cl.[7] ..... G10H 1/06; G10H 7/02
(52) U.S. Cl. ..... 84/603; 84/604; 84/622
(58) Field of Search ..... 84/601–607, 622–625, 84/615–620, 653–661, 678–690, 692–700, 735, 736, 742

(56) References Cited

U.S. PATENT DOCUMENTS

| | | | | |
|---|---|---|---|---|
| Re. 33,558 | * | 3/1991 | Katoh | 84/605 |
| 4,231,276 | * | 11/1980 | Ando et al. | 84/625 |
| 4,373,416 | | 2/1983 | Endo et al. . | |
| 4,437,379 | * | 3/1984 | Okumura | 84/607 |
| 4,641,564 | * | 2/1987 | Okamoto | 84/605 |
| 5,020,410 | | 6/1991 | Sasaki . | |

(List continued on next page.)

FOREIGN PATENT DOCUMENTS

| | | |
|---|---|---|
| 0 536 644 | 4/1993 | (EP) . |
| 0 597 381 | 5/1994 | (EP) . |
| 63-84190 | 6/1988 | (JP) . |
| 2-17964 | 7/1990 | (JP) . |
| 2-188795 | 7/1990 | (JP) . |
| 3-83136 | 4/1991 | (JP) . |
| 4-152393 | 5/1992 | (JP) . |
| 4-161994 | 6/1992 | (JP) . |
| 6-27964 | 2/1994 | (JP) . |
| 4-93895 | 8/1994 | (JP) . |
| 7-319471 | 12/1995 | (JP) . |
| 7-319472 | 12/1995 | (JP) . |
| WO 80/01215 | 6/1980 | (WO) . |

OTHER PUBLICATIONS

"Two Methods of Synthesizing Musical Sounds by Means of Multiple Microprocessors", Research Disclosure, No. 201, Jan. 1, 1981, p. 52, lines 25–29, XP002030867, ISSN:0374–4353.

*Primary Examiner*—Stanley J. Witkowski
(74) *Attorney, Agent, or Firm*—Morrison & Foerster

(57) ABSTRACT

A musical sound generating apparatus creates a waveform to generate a musical sound according to performance information. In the apparatus, a first waveform generator is operable for creating a waveform. A second waveform generator is operable independently from the first waveform generator for creating a waveform. An input device provides performance information. A designating device designates at least one of the first waveform generator and the second waveform generator in correspondence with the provided performance information. A controller selectively operates the designated one of the first waveform generator and the second waveform generator to create the waveform according to the provided performance information. An output device generates the musical sound based on the created waveform. The second waveform generator, the input device, the designating device and the controller are integrated with each other to constitute a main part composed of a computer, while the first waveform generator alone constitutes a supplementary part which is separate from the main part and which is optionally installable in the computer.

107 Claims, 23 Drawing Sheets

U.S. PATENT DOCUMENTS

| | | | | |
|---|---|---|---|---|
| 5,094,136 | * | 3/1992 | Kudo et al. | 84/603 |
| 5,119,710 | | 6/1992 | Tsurumi . | |
| 5,123,322 | * | 6/1992 | Hanzawa et al. | 84/605 |
| 5,319,151 | | 6/1994 | Shiba et al. . | |
| 5,345,035 | | 9/1994 | Yamada . | |
| 5,376,752 | | 12/1994 | Limberis et al. . | |
| 5,386,529 | * | 1/1995 | Kondo | 84/603 X |
| 5,451,710 | * | 9/1995 | Shimizu | 84/622 |

* cited by examiner (STEP Sa34)

COMPUTERIZED MUSIC SYSTEM HAVING SOFTWARE AND HARDWARE SOUND SOURCES

Matter enclosed in heavy brackets [ ] appears in the original patent but forms no part of this reissue specification; matter printed in italics indicates the additions made by reissue.

*This is a reissue application of U.S. Ser. No. 08/659,011 filed on Jun. 4, 1996 and issued as U.S. Pat. No. 5,714,703.*

BACKGROUND OF THE INVENTION

The present invention relates to a musical sound generator employed in computer application systems using CPU, such as electronic game machines, network karaoke apparatuses, personal computers etc., and more particularly relates to a musical sound generator capable of generating various musical sounds according to performance information.

Conventionally, in an apparatus such as a personal computer, musical sound can be reproduced by means of a specialized hardware module such as a sound source LSI and a sound source board, and by executing programs to control the installed sound source device. Recently, performance of CPU in the personal computer is remarkably improved so that the musical sound can be generated by the CPU in place of the specialized hardware module. This sort of the musical sound generation is called "software sound source" in contrast to "hardware sound source" which generates musical sound by the specific hardware. The CPU computes waveform data of musical sound according to a specific program. The quality of the sound generated by the software sound source depends upon the performance of the CPU executing the program. If the CPU has high performance, the waveform data can be computed at high speed so that a sampling frequency of the waveform data can be raised high to realize high quality musical sound generation. However, if the CPU performance is poor, it is difficult to compute the data at high speed so that the sampling frequency must be lowered. This inevitably results in poor quality of the reproduced musical sound.

From system to system, there is a wide variety in the configuration of the application systems such as the personal computer, with respect to installation of optional devices. Generally, the optional device includes a hard disk, a video card etc., in broader meaning. However, in the present invention, the optional device means an externally connectable device involved in the musical sound generation. It should be noted that the processing ability of the CPU may be different in various system configurations. Further, in a situation where an application program to generate sound and another application program to execute other jobs are simultaneously invoked in parallel, a load of the CPU may vary dependently on the running status of the programs and on the status of tasks currently executed in the system. In this fashion, the effective processing power of the CPU may vary in the same system. Thus, a user must rearrange basic setup for the sound generation whenever an environment of the system is changed, and that is very laborious. In such systems, the user cannot recognize whether the sound is not generated correctly in a current configuration setup, until any miss and skip of tone occurs at the actual reproduction of the sound. In other words, it is impossible to evaluate whether the system configuration is reasonable until the sound is actually reproduced. Further, no matter how high the CPU performance is, an external sound generation hardware may be utilized in many cases according to the user's desire in practical use of the hardware resource. In such cases, full use of the hardware sound source may cause a problem that it is impossible to generate a sound surpassing the limitation of the facility of the sound generation hardware. A variety of tones cannot be reproduced. A number of timbre kinds cannot be increased even if there is a sufficient processing power in the CPU.

SUMMARY OF THE INVENTION

The purpose of the present invention is to solve the problems descried above, and is to provide a musical sound generator capable of generating various musical sounds while retaining excellent quality of the sounds.

According to the invention, a musical sound generating apparatus creates a waveform to generate a musical sound according to performance information. The apparatus comprises first waveform generator means operable for creating a waveform, second waveform generator means operable independently from the first waveform generator means for creating a waveform, input means for providing performance information, designating means for designating at least one of the first waveform generator means and the second waveform generator means in correspondence with the provided performance information, controller means for selectively operating the designated one of the first waveform generator means and the second waveform generator means to create the waveform according to the provided performance information, and output means for generating the musical sound based on the created waveform.

Specifically, the input means comprises means for providing performance information which contains timbre information effective to specify a timbre of the musical sound and timing information effective to specify a timing of generation of the musical sound. Further, the designating means comprises means for designating one of the first waveform generator means and the second waveform generator means in correspondence with the timbre information so that the output means generates the musical sound having the specified timbre at the specified timing.

The designating means may include means operable if desired for coincidently designating both of the first waveform generator means and the second waveform generator means so that the controller means operates both of the first waveform generator means and the second waveform generator means to concurrently create waveforms in parallel manner.

The input means may comprise means for providing performance information effective to command concurrent generation of a plurality of musical sounds. Further, the designating means may comprise means for designating one of the first waveform generator means and the second waveform generator means according to a number of concurrent musical sounds specified by the performance information such that the designated one has a capacity sufficient to create a number of waveforms corresponding to the number of the musical sounds.

The designating means may further comprise means operative when the number of the concurrent musical sounds exceeds a capacity of either of the first waveform generator means and the second waveform generator means for designating both of the first waveform generator means and the second waveform generator means to ensure complete generation of the concurrent musical sounds.

The first waveform generator means may comprise an external waveform generator optionally connectable to the controller means while the second waveform generator means may comprise an internal waveform generator integrated with the controller means so that the designating means designates the internal waveform generator in place of the external waveform generator when the same is not connected to the controller means even though the external waveform generator should primarily correspond to the provided performance information.

The second waveform generator means, the input means, the designating means and the controller means may be integrated with each other to constitute a main part composed of a computer, while the first waveform generator means alone constitutes a supplementary part which is separate from the main part and which is optionally installable in the computer.

The first waveform generator means may be composed of a hardware module driven by the controller means, while the second waveform generator means may be composed of a software module installable in the controller means.

The second waveform generator means may comprise a plurality of digital waveform generators which are operable based on different algorithms to arithmetically create digital waveforms having different qualities. Further, the controller means may comprise means for selectively operating an optimal one of the digital waveform generators according to the provided performance information.

The second waveform generator means may include a digital waveform generator of a waveform memory type operable based on a relatively simple algorithm to create a digital waveform having a relatively low quality, and another digital waveform generator operable based on a relatively complicated algorithm to create another digital waveform having a relatively high quality.

The second waveform generator means may comprise a computerized waveform generator operable according to a given algorithm at a variable operation speed to create a digital waveform by successively computing sample values of the digital waveform. Further, the controller means may comprise means for provisionally operating the computerized waveform generator to carry out trial creation of a model digital waveform while measuring the operation speed at which the trial creation is carried out, determining means for optimally determining a sampling frequency comparable to the measured operation speed, and means for actually operating the computerized waveform generator to enable the same to successively compute sample values of an actual digital waveform at the determined sampling frequency according to the provided performance information.

The determining means may comprise means for fixing the sample frequency to one of stepwise predetermined levels, which is lower than and closest to the measured operation speed.

The controller means may further comprise changing means operative when the determined sampling frequency falls below a critical level which is defined to ensure a minimal quality of the digital waveform for changing the algorithm to raise the operation speed of the computerized waveform generator so that the sampling frequency can be redetermined to exceed the critical level.

The changing means may comprise means for changing the algorithm from a complicated one to a simplified one such that the computerized waveform generator operates based on the simplified one of the algorithm to successively read out prestored ones of sample values to reproductively create the digital waveform.

According to another aspect of the invention, a sound generating apparatus creates a digital waveform to generate a musical sound according to performance information. The apparatus comprises input means for providing performance information, computerized waveform generator means operable based on a given algorithm at a variable operation speed to create a digital waveform by successively computing sample values of the digital waveform, trial means for provisionally operating the computerized waveform generator to carry out trial creation of a model digital waveform while measuring the operation speed at which the trial creation is carried out, determining means for optimally determining a sampling frequency comparable to the measured operation speed, controller means for actually operating the computerized waveform generator to enable the same to successively compute sample values of an actual digital waveform at the determined sampling frequency, and output means for generating the musical sound based on the actual digital waveform according to the provided performance information.

In the inventive apparatus, the input means provides the performance information, and the designating means specifies which of the waveform generator means should generate a waveform of the musical sound relevant to the performance information. The waveform generator means specified by the designating means is controlled to generate the waveform of the musical sound relevant to the performance information. Thus, the performance information itself can specify which of the first and second waveform generator means should generate the waveform of the musical sound characterized by the performance information. The first and second waveform generator means are different from each other in their structure so that their processing load and characteristics of the generated sound may differ in the waveform generation between the first and second waveform generator means. Therefore, it is possible to generate various musical sounds by selecting the first waveform generator means for generation of the waveform of the musical sound relevant to a certain event of the performance information, and by selecting the second waveform generator means for generation of the waveform of the musical sound relevant to another certain event of the performance information. Further, it is possible to adjust the processing load by controlling the allocation of the waveform generator means to the performance information.

It is preferable to determine which of the waveform generator means to generate the waveform of the musical sound according go a timbre of the musical sound to be generated, because a certain type of the waveform generator means deserves an optimal creation of a certain timbre. The preferred waveform generator means to generate the waveform of the musical sound relevant to the performance information is determined according to the timbre specified by the performance information in the invention. The timbre information may be included in the performance information in the invention. As described above, due to the difference between the first and second waveform generator means, the characteristics of the musical sound may differ even if the same performance information is provided. In other words, various waveforms of the musical sound can be reproduced. With generating the waveforms of the musical sound simultaneously by both of the first and second waveform generator means according to the same performance information, variations of the musical sound can be realized for a common timbre by using the different waveform generator means.

Due to conditions of the musical sound generating, there may be a situation where a waveform of the musical sound should be generated by a substitute waveform generator means, even if a primary waveform generator means should deserve to generate the waveform according to the performance information. For example, this substitution may take place when the sound generating capacity of the primary waveform generator means almost reaches its maximum ability. In the invention, in addition to the performance information, the number of the generated waveforms of the musical sound is taken into account for determining which of the waveform generator means should generate the musical sound in order to prevent overflow of the waveform computation.

By the way, the first and second waveform generator means are the same in their waveform generating function, so that the user may not use both, but may use only one. For example, the first waveform generator means is detachable while the second waveform generator means is permanently installed. In the invention, if the first waveform generator means exists and the waveform of the musical sound relevant to the performance information should be generated by the first waveform generator means, the first waveform generator means is designated to generate the waveform of the musical sound relevant to the performance information. Otherwise, the second waveform generator means may be designated to generate the waveform of the musical sound relevant to the performance information if the first waveform generator means is incidentally detached from the apparatus. The waveform of the musical sound originally to be generated by the first waveform generator means can be generated alternatively by the second waveform generator means. Thus, even if the first waveform generator means does not exist, the waveform of the musical sound is safely generated.

In the invention, the first and second waveform generator means can respectively compute sample values of the waveform of the musical sound. The trial means measures a time required for the second waveform generator means to generate the waveform of the musical sound. The sampling frequency is determined according to the time measured by the trial means. Thus, the musical sound can be generated at the optimum sampling frequency for the system configuration. Generally, if the sampling frequency is varied continuously, an arrangement to handle the frequency determination tends to become complicated. However, in a specific form of the invention, the sampling frequency determined by the determining means is selected from stepwise predetermined levels.

If the sampling frequency determined by the determining means is lower than the critical level, the computation process of the waveform is changed since the quality of the generated wound is not retained by the original waveform generation at the determined sampling frequency. In this case, it is preferable to change the computation process such as to simply read out sample values of the waveform of the musical sound in order to raise the sampling frequency.

DETAILED DESCRIPTION OF THE INVENTION

Figure 1:
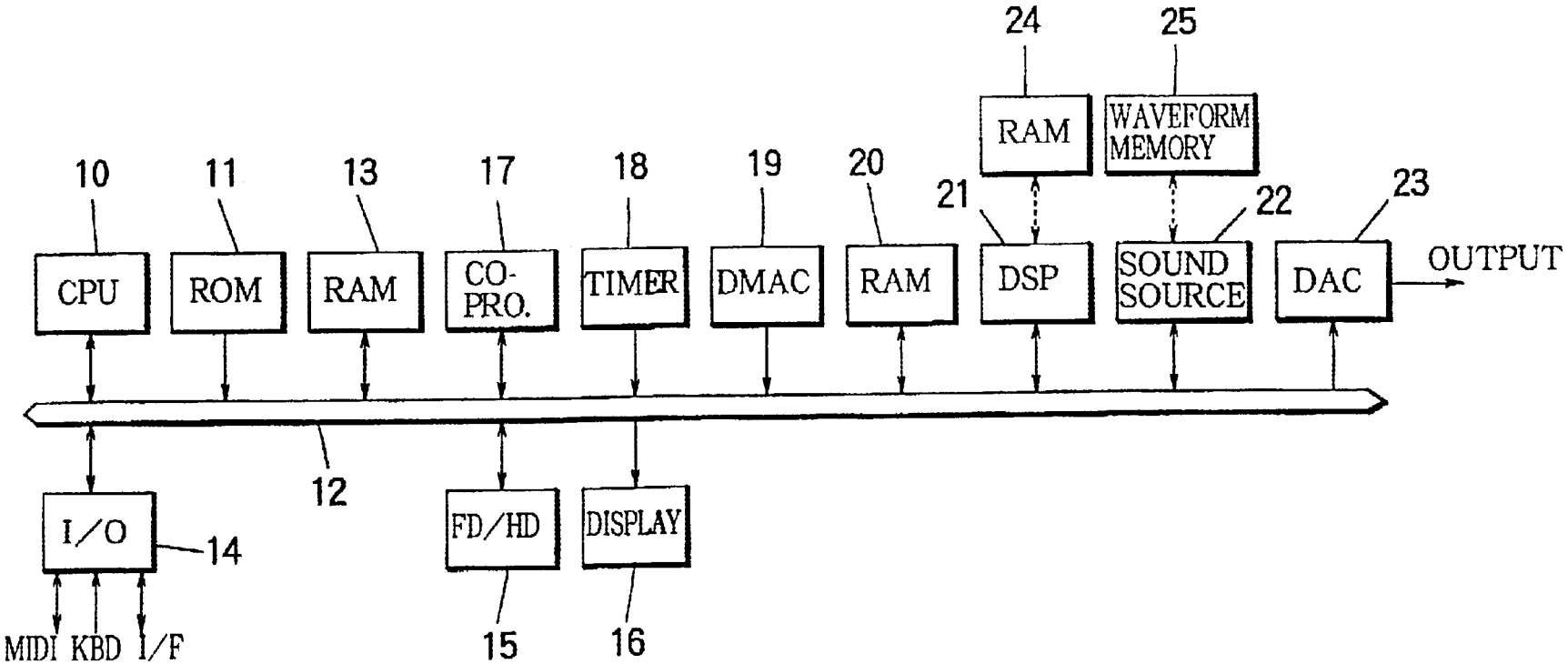
FIG. 1 is a schematic block diagram illustrating a first embodiment of the inventive musical sound generator.

Details of embodiments of the present invention will be described hereunder with reference to the drawings. FIG. 1 is a schematic block diagram showing a first embodiment of a musical sound generator according to the present invention. In FIG. 1, numeral 10 denotes a CPU, which controls various units composing a computer system via a data bus 12, according to a basic program stored in a ROM 11. Numeral 13 denotes a RAM temporarily storing various registers, flags and data. Numeral 14 denotes an I/O port of the multi type which receives and transmits MIDI information, key information provided upon key operation of a keyboard (not shown), and other miscellaneous information via various interfaces I/F (not shown). The multi type I/O port 14 receives performance information in the form of the MIDI information or the key information KBD. In the present embodiment, it is assumed that the performance information may be generated by an automatic performance program. In this case, the automatic performance program means that the performance information is generated in time series by a certain automatic sequence program. Therefore, the arrangement shown in FIG. 1 works not only as a musical sound generator but also a sequencer. The type of I/F may be a serial or parallel port, RS-232C, RS-422 and so on. Especially in case of RS-232C, the computer system communicates with a host station through a public telephone network by a modem (not shown). Thus, the input source of the performance information may be the keyboard in case that the keyboard operation information is provided, or an external device connected through the I/F in case that the MIDI information is provided, or a sequence program executed by the CPU in case that the automatic performance information is provided. Numeral 15 denotes a storage unit, which is comprised of FD (Floppy Disk) or HD (Hard Disk). The storage unit 15 further stores application programs and data. Numeral 16 denotes a display which is composed of CRT or LCD (Liquid Crystal Display). The display 16 presents various data under the control of the CPU 10. Numeral 17 denotes an optional co-processor which executes floating point computation instead of the CPU 10. The rest of data processing is carried out by the CPU 10. Numeral 18 denotes a timer which counts time in timer processing described later. Numeral 19 denotes a DMAC (Direct Memory Access Controller) which transfers data to and from RAM 20 directly without the control by CPU. Nowadays, the co-processor 17, timer 18 and DMAC 19 may be accommodated in a single chip together with CPU 10, though these are discrete devices in the present embodiment. Numeral 20 denotes a RAM which has a structure similar to the first-mentioned RAM 13 with respect to its hardware construction. However, the RAM 13 is used as a work area for the program execution by the CPU, while the other RAM 20 is a waveform memory which temporarily stores a waveform represented by wave data. Numeral 21 denotes a DSP (Digital Signal Processor) for use in digital signal processing required for musical sound synthesis. Numeral 22 denotes an optional sound source which constitutes a first waveform generator of one chip LSI for generating a waveform of the musical sound according to performance information. Numeral 23 denotes a D/A converter which is enabled when a flag DACENBL is set to "1". Before the D/A converter 23, an FIFO data buffer (not shown) is normally provided. The wave data stored in the FIFO is read out at a sampling frequency fs. After the D/A converter 23, an LPF (Low Pass Filter) is normally provided (not shown). A cutoff frequency of the LPF is set to about half of the sampling frequency fs. The LPF is an output device of the musical sound generator. The musical sound is reproduced through an amplifier and a speaker. Numeral 24 denotes a RAM which is structured similarly to the RAM 13 or 20 with respect to its hardware construction. The RAM 24 is utilized as a work memory for the arithmetic operation of the DSP 21. Numeral 25 denotes a waveform memory which stores wave data of basic or typical timbres in case that the sound source 22 generates a musical sound according to a waveform memory readout method. The role of the waveform memory 25 and the RAM 20 is slightly different in a manner that the waveform memory 25 is used mainly by the sound source 22 and is provided in the form of ROM or a daughter board, while the RAM 20 is utilized by the CPU 10 as a waveform memory.

Generally in the arrangement above, some devices such as co-processor 17, DSP 21, sound source 22, RAM 24, and waveform memory 25 are often optionally installed according to user's choice. If the RAM 24 is not installed, a certain area of the RAM 13 is allocated for the DSP 21. The waveform memory 25 may not be installed if the sound source 22 is an FM synthesizing device which generates a musical sound by pure computation of wave data. The CPU 10 recognizes whether these optional devices are installed or not. In the present embodiment, the CPU 10 recognizes the existence of the optional devices according to one of methods listed below:

(1) A port address is reserved for a corresponding device connection. The CPU 10 accesses the port address immediately after power-on or reset of the system. If the CPU 10 detects a predetermined sign from the port address, it recognizes the existence of the corresponding device.

(2) A jumper switch is provided for signifying the device installation. The user turns the switch on at the time of installing the corresponding device.

(3) If the system is implemented as a personal computer, the optional devices are registered in a configuration file in terms of corresponding device drivers or in a batch file. The system software recognizes the devices through these files.

Figure 2:
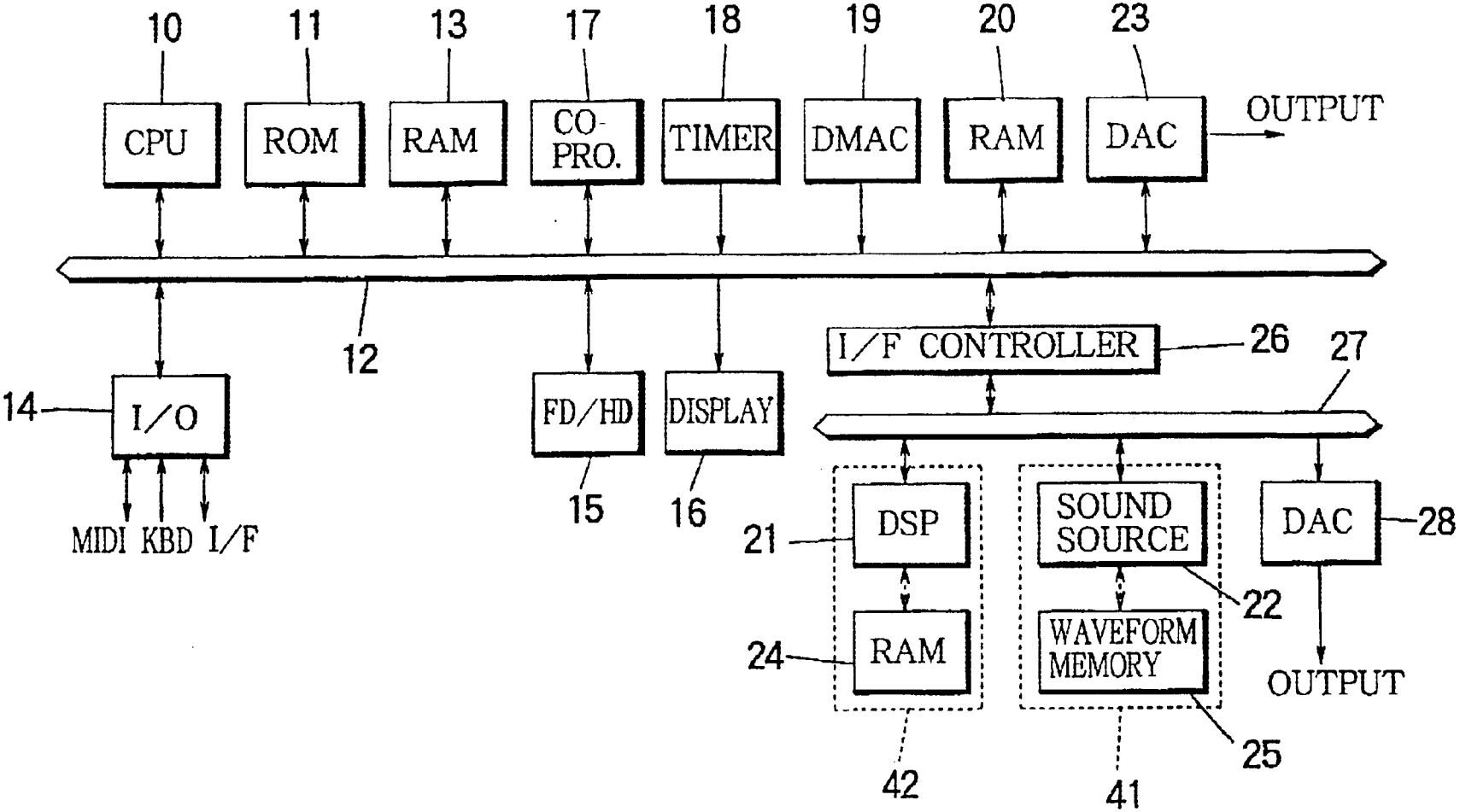
FIG. 2 is a schematic block diagram illustrating a variation of the embodiment shown in FIG. 1.

All these optional devices are fully installed and connected to the data bus 12 in the present embodiment. However, the connection port is not limited to the data bus 12. The optional devices may be connected via serial/parallel interfaces, through which each device carries out data transaction mutually with the CPU 10. In other words, any kind of interface is possibly provided for the optional devices, provided that the device can communicate with the CPU through the interface. For example, the sound source 22 may actually be provided as a sound source board 41 or an extension board as shown in FIG. 2. In this case, the board 41 is inserted into a slot on a main board or mother board. The sound source board 41 communicates with the CPU 10 through the bus 12. I/F controller 26, and extension interface 27. The waveform memory 25 may be installed through a socket provided on the sound source board 41 in this arrangement. Additionally, the extension interface 27 may be provided with an additional D/A converter 28. Otherwise, the sound source 22 may be provided in the form of a discrete LSI chip, or mounted on the daughter board. The chip or daughter board is installed through a socket provided on the mother board or extension board in this arrangement. Similarly, the DSP 21 may be provided in the form of a DSP board 42. In this case, the DSP 21 communicates with the CPU 10 via the extension interface 27. Otherwise, the DSP 21 may be provided in the form of a discrete LSI chip likewise the sound source 22. The input data is transferred to the D/A converter 23 through the bus 12 in FIG. 1. However, the data can be distributed directly or through the extension interface, if the DSP 21 or sound source 22 is installed through the socket or the extension interface.

Figure 3:
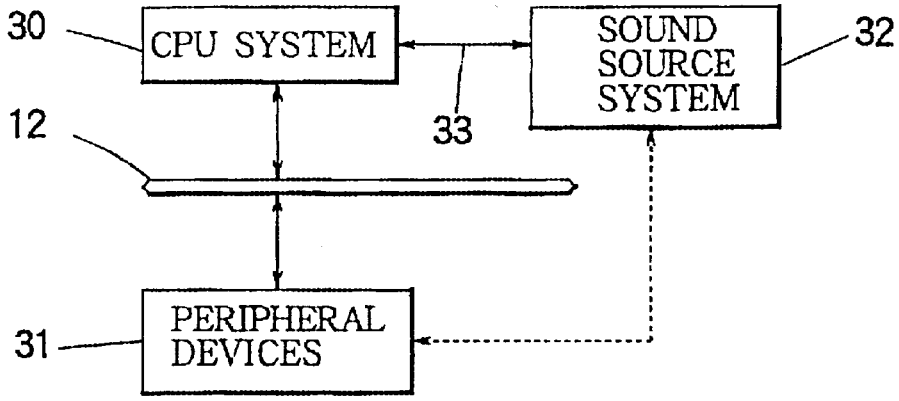
FIG. 3 is a schematic block diagram illustrating another variation of the embodiment shown in FIG. 1.

As shown in FIG. 3, a first waveform generator or sound source system 32 comprised of the sound source 22 or the DSP 21 can be connected to a local bus 33, through which the data is transferred to and from a CPU system 30 without using the data bus 12. The CPU system 30 is composed of a standard arrangement including the CPU 10, ROM 11 and RAM 13, while peripheral devices 31 include multi type I/O port 14, storage unit 15, and miscellaneous interfaces and operators. The sound source system 32 is specifically composed of the discrete sound source 22 or DSP 21 in the embodiment. However, in general, any functional elements for the musical sound generation are involved in the sound source system 32. The sound source system 32 may be integrated with or separated from the CPU system 30. Further, the connection interface can be provided at either of the CPU side and the sound source device side. Namely, any connection interface may be employed according to the inventive system setup. Additionally to the local bus, any sort of interface/protocol combination such as MIDI, RS-232C/422, IEEE P-1394, or SCSI may be employed. Also, communication network such as public telephone network may be used as the data communication media.

Figure 4A:
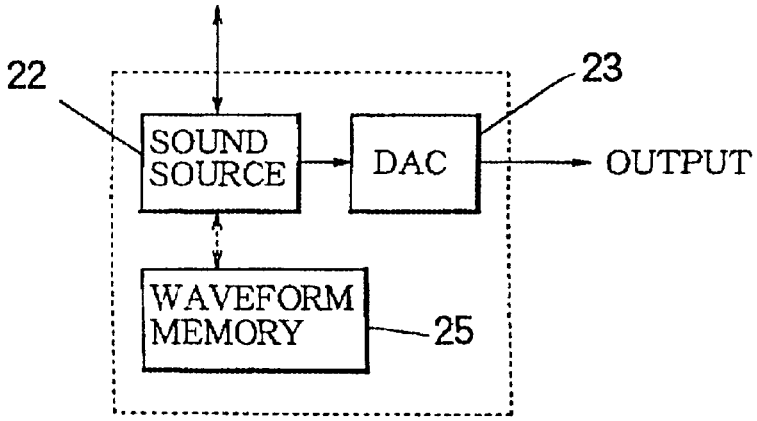
FIG. 4A is a schematic block diagram illustrating an arrangement in which a sound source device and its peripheral devices are integrated with each other.
Figure 4B:
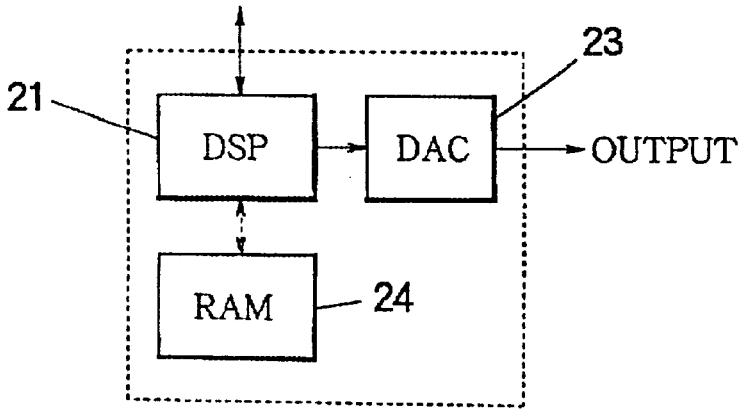
FIG. 4B is a schematic block diagram illustrating an arrangement in which a DSP and its peripheral devices are integrated with each other.

In an arrangement shown in FIG. 4A, the sound source device 22 may be integrated into a single chip, or into a printed circuit board module together with the waveform memory 25 and the D/A converter 23. Similarly, as shown in FIG. 4B, the DSP 21, RAM 24, and D/A converter 23 may be integrated altogether into a single Chip.

The arrangements shown in FIGS. 1 to 3 are nothing but an example. The style of the device connection depends upon the individual system setup. Further, two or more of the functional elements shown in FIG. 1 may be integrated into a single chip.

According to the invention, the above constructed musical sound generating apparatus creates a waveform to generate a musical sound according to performance information. A first waveform generator such as the sound source 22 or the DSP 21 is operable for creating a waveform. A second waveform generator composed of the CPU 10 is operable independently from the first waveform generator for creating a waveform. The I/O 14 provides performance information. One of the first waveform generator and the second waveform generator is designated in correspondence with the provided performance information. The apparatus selectively operates the designated one of the first waveform generator and the second waveform generator to create the waveform according to the provided performance information. The DAC 23 generates the musical sound based on the created waveform. The first waveform generator comprises an external waveform generator optionally connectable to the apparatus while the second waveform generator comprises an internal waveform generator integrated with the CPU 10. Occasionally, the internal waveform generator is designated in place of the external waveform generator when the same is not connected to the apparatus even though the external waveform generator should primarily correspond to the provided performance information. The second waveform generator is integrated with the CPU 10 to constitute a main part composed of a computer, while the first waveform generator alone constitutes a supplementary part which is separate from the main part and which is optionally installable in the computer. The first waveform generator is composed of a hardware module driven by the CPU 10, while the second waveform generator is composed of a software module installable in the computer.

Figure 5:
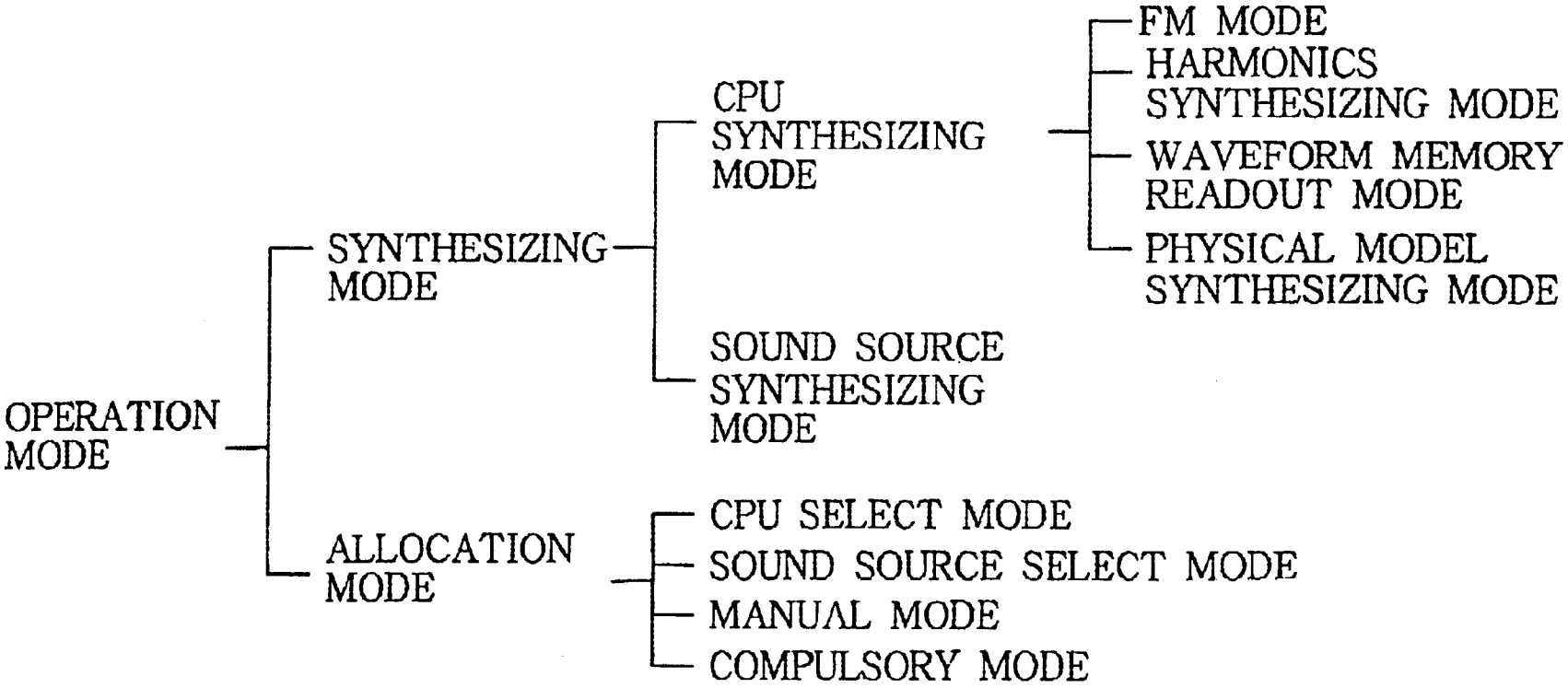
FIG. 5 illustrates operating modes in the first embodiment according to the present invention.

Various operating modes in the present embodiment will be described hereunder. The operating modes of the inventive musical sound generator can be categorized, as shown in FIG. 5, into two major groups, one of which relates to designation of a synthesizing method, and the other of which relates to allocation of a timbre to the different waveform generators. The two major groups are divided into more specific modes. First of all, the modes to specify the synthesizing method will be described hereunder.

In the present embodiment, the sound generation is carried out by synthesizing a waveform or wave data of a musical sound according to the performance information, and by converting it into an analog signal. The wave data can be generated in various methods. The used method is determined according to the operating mode in which the synthesizing method is specified. In the present embodiment, CPU synthesizing mode by the second waveform generator and sound source synthesizing mode by the first waveform generator are assumed by selection.

In the CPU synthesizing mode, a musical sound is synthesized only by the CPU 10, or by combination of the CPU 10 and the co-processor 17. Further, the CPU synthesizing mode can roughly be divided into the following four submodes. The generated waveform is converted into an analog signal by the D/A converter 23 for acoustic reproduction.

FM Mode

This FM mode utilizes a software module of an FM sound source for synthesizing a sound. The wave data is generated by real-time FM modulation over a basic sine wave by means of the CPU 10.

Harmonics Synthesizing Mode

The harmonics synthesizing mode is such that a fundamental waveform and its harmonics are synthesized altogether. With the real-time operation by the CPU 10, a fundamental waveform and its harmonics are calculated to synthesize the waveform.

Wave Form Memory readout Mode

In this mode, the sound is synthesized by accessing a waveform memory. Prior to the synthesizing, the CPU 10 loads a plurality of basic waveforms into the RAM 20. Upon a synthesizing command entry, the CPU generates the wave data of a specified timbre at a specified pitch and volume by reading out the waveform. In the waveform memory readout mode, it is possible to synthesize a sound even with a low performance CPU, since the synthesizing is carried out by accessing RAM or ROM to read out wave data. Thus, a work load of the CPU in this mode is smaller than that in the FM mode and the harmonics synthesizing mode. However, the RAM should be allocated with a wave data area, so that shortage of a free area of the RAM 13 or 20 may be caused occasionally. Thus, the waveform memory readout mode may not be used preferably under some situations dependently on total RAM capacity and CPU addressing volume.

Physical Model Synthesizing Mode

In the physical model synthesizing mode, the sound generation mechanism of an actual musical instrument, such as air flow in a tube, is simulated by an electronic model in order to synthesize the sound. The wave data is computed with real-time operation of devices including the CPU 10. An example of the algorithm for the physical model synthesizing is disclosed in JP-A-63-40199.

As listed above, the CPU-aided software sound source or the second waveform generator includes a plurality of digital waveform generators which are operable based on different algorithms to arithmetically create digital waveforms having different qualities. The inventive apparatus selectively operates an optimal one of the digital waveform generators according to the provided performance information. Specifically, the second waveform generator includes a digital waveform generator of the waveform memory readout type operable based on a relatively simple algorithm to create a digital waveform having a relatively low quality, and other digital waveform generators operable based on a relatively complicated algorithm to create another digital waveform having a relatively high quality.

On the other hand, in the hardware sound source synthesizing mode, the musical sound is synthesized using a specific hardware such as the LSI sound source 22. As a matter of course, in this mode, the hardware module such as the LSI sound source 22 must be installed in the system. The LSI sound source 22 synthesizes the wave data by the FM mode or the waveform memory readout mode (likewise the software sound source). The synthesizing method is determined by the hardware itself. The CPU 10 does not cover the control of the native synthesizing process of the sound source 22.

In the present embodiment, a multiple of voice channels are provided. One channel is allocated for one tone in either of the CPU synthesizing mode and the sound source synthesizing mode. A plurality of musical sounds are generated in the multiple of the channels to realize concurrent sounding of the plural voices. Since the wave data can be synthesized by both of the CPU 10 and the sound source device 22 in the present embodiment, selection of the waveform generators to be utilized is an important issue. In the present embodiment, optimum one of the waveform generators is designated according to the voice allocation upon accepting a note-on command. The allocation mode includes the followings:

CPU Select Mode

In the CPU select mode, the waveform synthesizing is effected by the CPU synthesizing mode at first priority. However, if the capability of the computing devices including the CPU 10 is not enough, the number of voice channels which can be used for the synthesizing is limited. In such a case, a part of the waveform synthesizing operation exceeding the capacity of the computing devices including the CPU 10 is carried out by the hardware sound source.

Sound Source Select Mode

In the sound source select mode, the waveform synthesizing is effected by the hardware sound source at first priority. However, if the capability of the hardware sound source device 22 is not enough, the number of the channels which can be used for the synthesizing is limited. In such a case, a part of the waveform synthesizing operation exceeding the capacity of the sound source device 22 is carried out by the CPU software sound source.

Manual Mode

In the manual mode, the user manually specifies either of the software and the hardware sound sources. Further, a specific synthesizing mode is designated if the CPU-aided software sound source is specified.

Compulsory Mode

In the compulsory mode, the sound source to be used is forcibly determined according to running state of application programs other than the sound generation program without regard to the user's intention.

Figure 6:
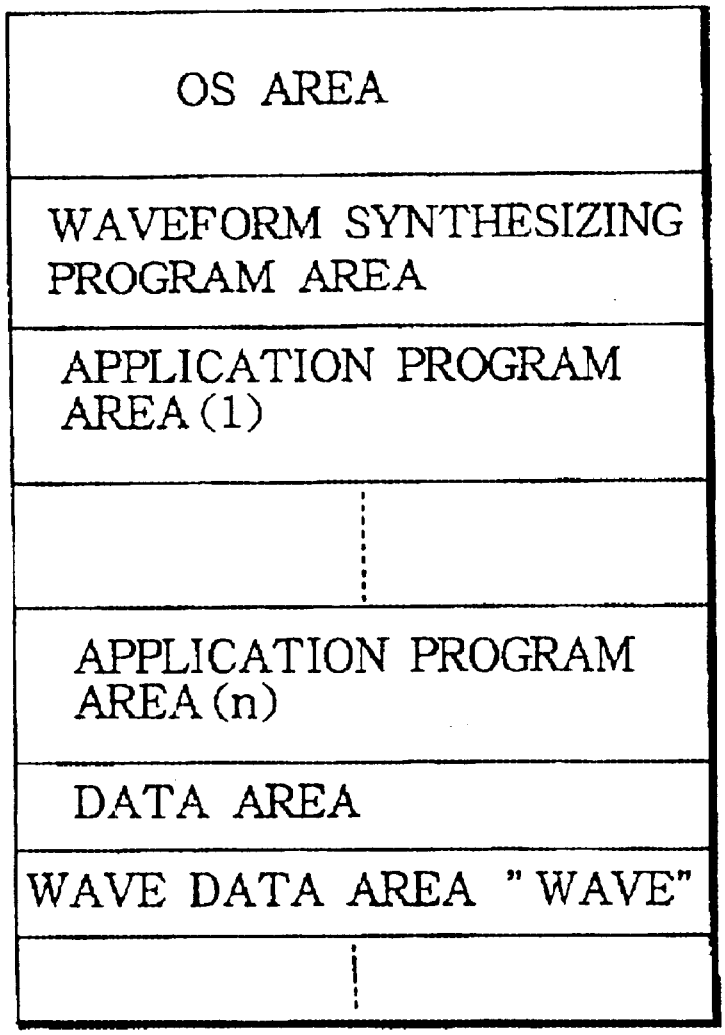
FIG. 6 is a memory map of a RAM provided in the first embodiment.

A memory map of the RAM 13 or 20 will be described hereunder. The arrangement of the inventive musical sound generator is not so different from general personal computers. Further, the general personal computer can be used as the musical sound generator provided that it executes operations related to the waveform synthesis. Thus, the content of the RAM 13 or 20 is not so different from that of the personal computer. The memory space of the RAM 13 or 20 is divided into a plurality of areas as shown in FIG. 6. In FIG. 6, an OS area is occupied by the operating system as in the general personal computer. The application program areas (1) to (n) accommodate various application programs other than the waveform synthesizing program. These areas are allocated one by one for the invoked application programs. Song data and other miscellaneous data are stored in a data area, while the wave data is loaded into a wave data area WAVE when the synthesizing is carried out by the waveform memory readout method. Lastly, a designated one of waveform synthesizing programs is stored in a waveform synthesizing program area.

Figure 7:
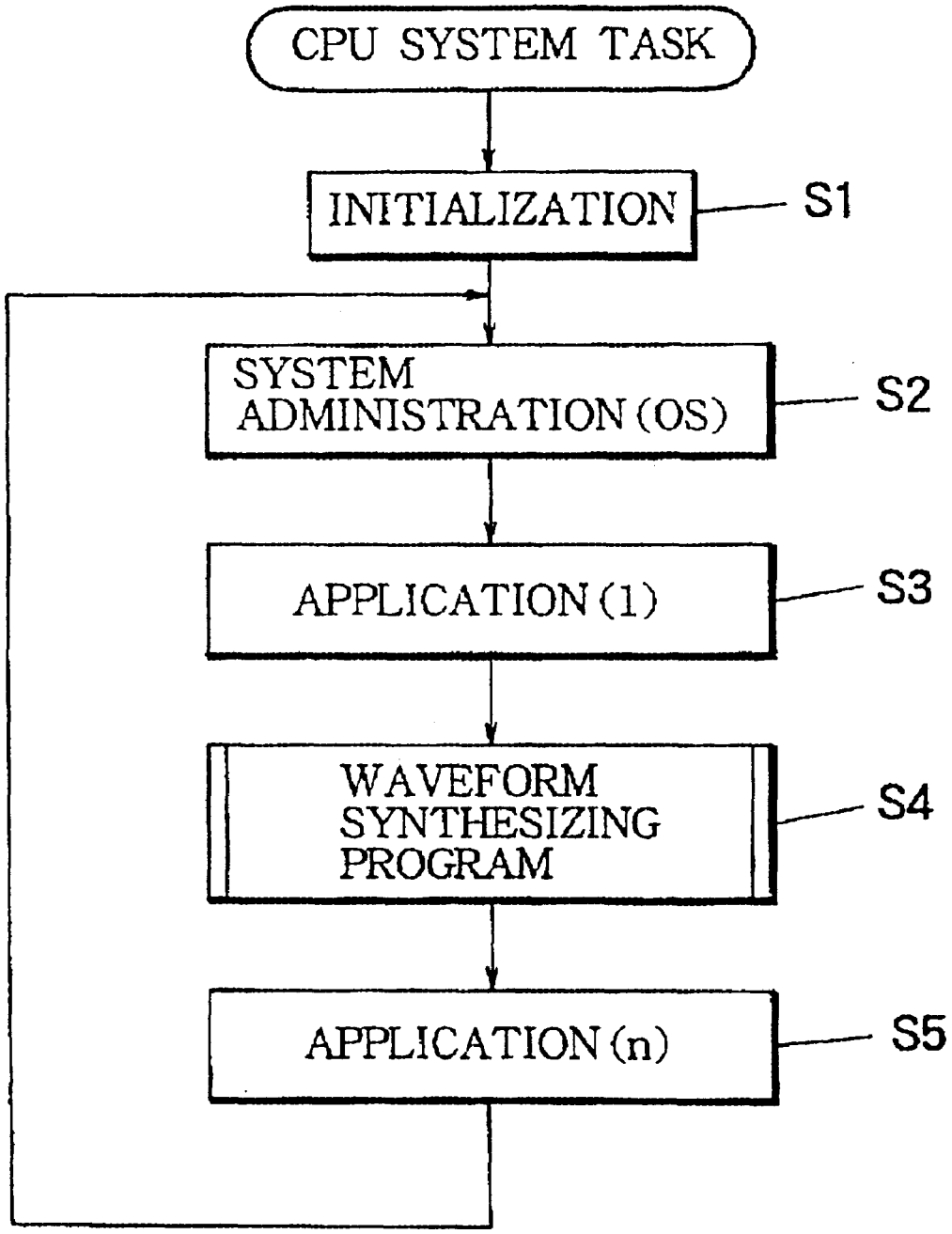
FIG. 7 is a flowchart illustrating an overall process executed in the first embodiment.

The operation of the musical sound generator according to the invention will be described hereunder. The musical sound is generated by executing a specific application program of the personal computer, namely, the waveform synthesizing program. Otherwise, the waveform synthesizing program may be implemented as a facility of the OS in the form of a transient program which is automatically installed at the time of boot-up of the system. Even though the memory address and execution permission of the waveform synthesizing program depends on configuration of the OS environment, user operation, number of application programs, operating conditions etc., the waveform synthesizing program is executed as one of the applications (1) to (n). Upon power-on or reset of the musical sound generator, as shown in FIG. 7, various registers and flags are set/reset for initialization in step S1. In step S2, system administration process of the OS is executed. In steps S3 to S5, the application program (1), the waveform synthesizing program, and the application program (n) are respectively executed. The waveform synthesizing program is executed to generate one sample value of the wave data at one cycle of the program invocation. The application programs (1) to (n) do not include the waveform synthesizing program. These application programs may be related to music performance, or to entirely different affairs. After step S5, the procedure returns to S2.

If there is no change in execution status of the application programs, the loop of S2 to S5 is repeatedly executed. Otherwise, if there is a change in the execution status of the application programs, such a change is detected at the system administration process in step S2. If the change of the status is of program termination, the relevant execution step of the application program is skipped. If the change of the status is of program invocation, a step to execute a new application program is added in the loop, and the whole loop is executed repeatedly. Thus, the executing period of the loop changes dependently on the running situation of the application programs and the system load. However, regardless of the running situation of the application programs, one sample value of the wave data of the musical sound is always generated per loop. A series of the sample values are generated continuously by repeating the loop to create a desired waveform. Thus, if the generated wave data is simply converted into an analog signal, the sampling period is varied, so that jitter may occur in the reproduced musical sound. The data buffer is provided before the D/A converter 23 in order to temporarily store the generated wave data of the sound. The data buffer is accessed for readout of the wave data at a fixed sampling frequency fs. If the musical sound generation is conducted by a fixed program in a certain case where the system is not a personal computer but a stand-alone electronic musical instrument, sound source module, or any other systems having a facility to generate sound, the execution period of the loop process can be fixed. In other words, the loop process is executed at a fixed interval. In such a case, it is very practical to make the loop interval to coincide with the reciprocal of the sampling frequency fs so that the data buffer can be eliminated.

The waveform synthesizing program executed in step S4 is described hereunder referring to FIGS. 8 to 11. The program is executed after loading thereof from the storage unit 15 according to a predetermined operation. In step Sa1, the synthesizing mode and the hardware step are checked. In the hardware setup check, optional devices are recognized by the check method described before. As for the operating mode, both of the synthesizing mode and the voice allocation mode are checked as well. With respect to the operating mode setup, if other application programs are executed before invoking the waveform-synthesizing program, the voice allocation mode may be turned to the compulsory mode. Otherwise, the synthesizing mode and the voice allocation mode may be set up according to the user choice via a displayed menu to input desired settings. Further, if various sound source devices are recognized in the hardware check, it is possible to set either of the CPU select mode or the sound source select mode. Thus, in the operating mode setup in step Sa1, the operating mode is set up and recognized before executing the waveform synthesizing program. In step Sa2, waveform loading process is executed. In the waveform loading process, typical or basic waveforms are loaded into the area WAVE allocated in the RAM 13 or 20 in case that the basic waveform is used in the waveform memory readout mode. In step Sa3, it is tested whether a flag SETFLG is "1" or not. The flag SETFLG is initially set to "0", but may be turned to "1" if the sampling frequency fs is set up in step Sa21, or if the waveform memory readout mode is designated in a backup waveform computation mode. The procedure advances forward to step Sa4 if the flag SETFLG is "1". Otherwise, if the flag SETFLG is "0", the procedure jumps to step Sa5. In case that the waveform synthesizing program is executed in the loop shown in FIG. 7 at the first time, the flag SETFLG is "0", and the procedure unconditionally advances forward to step Sa5. However, the process of step Sa4 is also described here, for convenience of description. In step Sa4, it is tested whether the sound synthesizing should be carried out entirely by the CPU synthesizing mode or not. It is possible to use the result of the hardware check in step Sa1 to detect whether any external sound source device is recognized or not. If there is possibility of using any sound source other than CPU for the waveform synthesizing, step Sa4 branches to "No" direction. In step Sa5, a flag ENBLFLG is tested if it is "1" or not, in order to detect a nonoperable state. The nonoperable state means that the sampling frequency fs is neither set up in the waveform generation procedure, nor the backup waveform computation mode is enabled. Therefore, the CPU synthesizing mode is not yet ready in the nonoperable state.

When the waveform synthesizing program is executed in the main loop shown in FIG. 7 at the first time, the flag ENBLFLG is "0" so that the procedure advances forward to step Sa11. However, the process under an operable state in case that the flag ENBLFLG is "1" is described here just for convenience of description. The operable state means that all the preparation for the CPU synthesizing is already completed. In this state, the procedure advances forward to step Sa6, where processing of performance information is done. In step Sa7, existence of a CPU waveform generation command is checked. The CPU waveform generation command is generated in response to a key-on event contained in the keyboard information KBD, MIDI information or performance information fed from the I/F under the CPU synthesizing mode. If the CPU waveform generation command is detected in step Sa7, the procedure responsive to the command is executed in Step Sa8. In the procedure of step Sa8, the wave data is generated by a specific synthesizing mode selected out of the available CPU synthesizing modes. The wave data is then distributed to the D/A converter 23 via the bus 12. Thus, the sound generation is accomplished according to the synthesized wave data or waveform.

In broader definition, the CPU waveform generation command may include a key-off event commanding note-off, though explanation for the procedures relevant to the key-off event is omitted here. These note-off procedures are very simple process such as release of the waveform generation and termination of the waveform generation. If no CPU waveform generation command is detected in step Sa7, the waveform synthesizing computation in step Sa8 is skipped, since there is no job to be executed. In step Sa9, it is tested whether terminating operation of the waveform synthesizing program is conducted by the user or not. If the termination of the program is not indicated, the procedure immediately returns to prepare for a next CPU waveform generation command. On the other hand, in case that the termination command is inputted, the waveform synthesizing program is terminated by setting the flag SETFLG to "0" in step Sa10.

Figure 11:
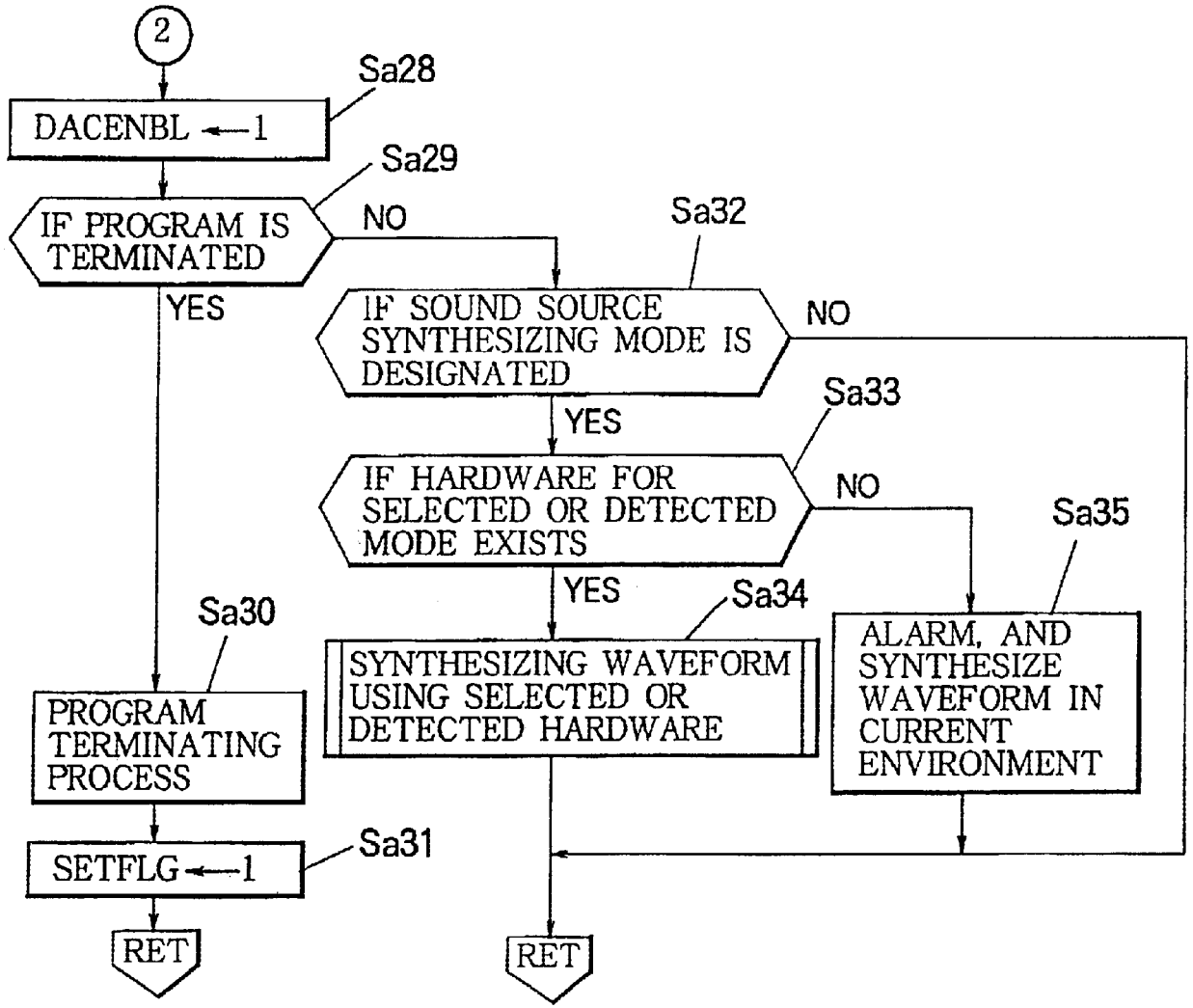
FIG. 11 is a flowchart illustrating the waveform synthesizing program executed in the first embodiment.

If the waveform synthesizing program is executed at the first time in the main loop of FIG. 7, the flag ENBLFLG is "0". Then, in step Sa11, it is tested whether the allocation mode is either of the CPU select mode and the sound source select mode. If the allocation mode is the manual mode or compulsory mode, the detection result is "No" so that the procedure advances forward to step Sa12, where the flags ENBLFLG, DACENBL, and SETFLG are all set to "1". Then, the procedure returns. The flag DACENBL is set to "1" to enable the D/A converter 23. Thus, if the waveform synthesizing program is executed next time and the external sound source is used, the check of step Sa3 results in "Yes" and the check of step Sa4 results in "No" so that the procedure shown in FIG. 11 is executed. Otherwise steps Sa6 to Sa10 are executed if the waveform synthesizing is effected by only the CPU.

On the other hand, when it is detected that the allocation mode is either of the CPU or sound source select mode in step Sa11, the procedure advances forward to step Sa13. The processing in steps Sa13 to Sa27 shown in FIGS. 9 and 10 may be done if the waveform generation program is invoked at the first time. In the process, the sampling frequency fs is determined for synthesis only by the CPU. In step Sa13, the flag ENBLFLG is switched to "0", a flag BUSY is set to "1", and the flag DACENBL is set to "0" explicitly, the flag BUSY is set to "1" to enable counting up in timer process described later. Setting of the flag DACENBL to "0" is done in order to disable the output operation of the D/A converter 23 to prevent sound generation during the trial waveform computation described later. After step Sa13, registers SCOUNT and TCOUNT are reset to "0". The content of the register SCOUNT indicates loop cycles of the following trial waveform computation. The register TCOUNT incrementally counts up while the flag BUSY is switched to "1". Thus, this register indicates a lapse time required to generate one waveform by m cycles of the synthesis computation. In step Sa15, one sample value for one sampling period is generated by the execution of a predetermined wave data generation algorithm. The detail of the processing in step Sa15 will be described later. In step Sa16, the register SCOUNT is incremented by "1" whenever the sample value computation is executed once. In step Sa17, it is tested if the register SCOUNT reaches cycle "m". If it is detected NO, the procedure returns to step Sa15. Otherwise, the procedure advances forward to step Sa18 in FIG. 10 in case that the check result is YES. Thus, the steps Sa15 and Sa16 are repeated until the loop cycle of the sample value computation reaches to "m".

Figure 10:
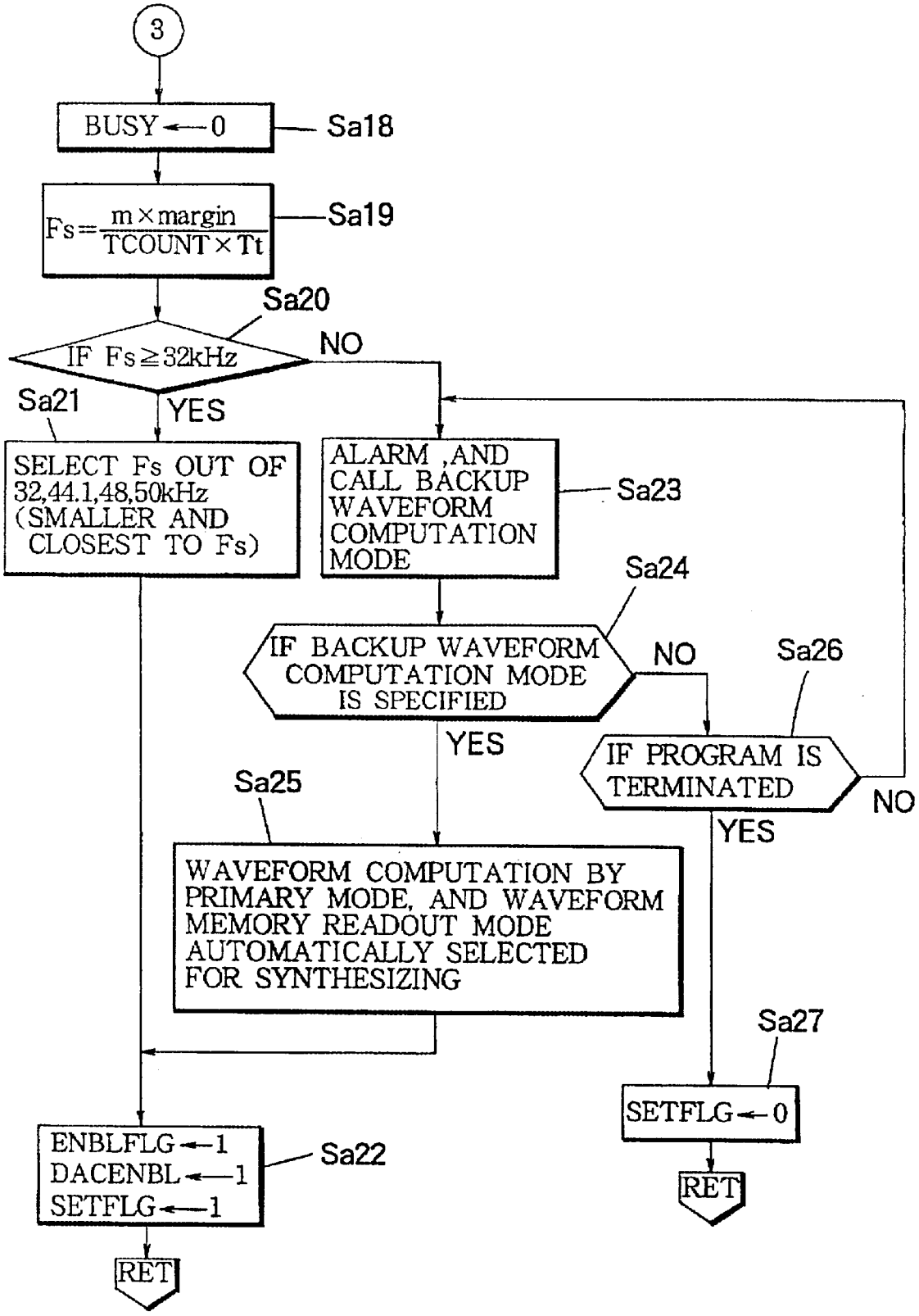
FIG. 10 is a flowchart illustrating the waveform synthesizing program executed in the first embodiment.

In step Sa18 of FIG. 10, the flag BUSY is switched to "0" to disable the counting up of the timer. Then, in step Sa19, a frequency Fs is calculated by the following equation (1).

$$Fs=(m\cdot margin)/(TCOUNT\cdot Tt)$$

In this equation, the "margin" is a constant set smaller than value 1 to provide the computation devices including the CPU 10 with some margin, considering the processing power of the devices. As described before, TCOUNT indicates invocation times of the timer during the period required to "m" cycles of the execution of the sample value calculation, while Tt indicates a pitch of the timer. Thus, the product of TCOUNT and Tt corresponds to the period required for completing the sample value calculation process to generate one waveform.

Thus, the frequency Fs calculated by the equation (1) is the frequency of the waveform sampling, and the constant "margin" reflects the processing power of the hardware setup.

In step Sa20, it is detected whether the calculated frequency Fs is greater than 32 kHz or not. This critical frequency "32 kHz" is employed considering the minimum quality of the musical sound to be generated. If this detection result is positive, which means that the processing power of the CPU is evaluated as sufficient for maintaining the minimum quality of the sound, the procedure advances forward to step Sa21. In step Sa21, an adequate sampling frequency fs smaller than and closest to the calculated frequency Fs is selected out of 32 kHz, 44.1 kHz, 48 kHz, and 50 kHz. If the calculated frequency Fs is 47 kHz, the sampling frequency Fs is set to 44.1 kHz, which is closest to and smaller than 47 kHz. The value smaller than the calculated frequency Fs is selected because the constant margin does not make sense if the sampling frequency fs is set to exceed the processing power of the CPU. After step Sa21, the flags DACENBL, ENBLFLG and SETFLAG are all set to "1" in step Sa22, and the procedure returns. This flag operation enables the D/A converter 23 to output the musical sound. Further, this flag operation indicates that the sampling frequency fs is set up. Consequently, the nonoperable state is changed to the operable state.

Under the operable state, upon the next execution of the waveform synthesizing program, check of step Sa4 results in "No" so that the synthesizing is done by the processing shown in FIG. 11 if the waveform synthesizing should be carried out by the external sound source device. Otherwise, if only the CPU is used for the waveform synthesizing, check of step Sa4 results in "Yes" and check of step Sa5 results in "No" so that the synthesizing is carried out through steps Sa6 to Sa8.

On the other hand, in FIG. 10, if the result of the test about the calculated frequency Fs in step Sa20 is turned out "No", which means that the minimum quality of the sound cannot be retained, the procedure advances forward to step Sa23. In the step Sa23, the user is warned that the minimum quality of the sound is not available, and the backup waveform computation mode is cared. The backup waveform computation mode is the waveform memory readout mode which is selected as a secondary choice when the minimum quality of the sound is not affordable with the primary synthesizing mode selected out of the available CPU synthesizing modes. In step Sa24, it is tested whether the backup waveform computation mode is designated or not. If YES, the procedure goes forward to step Sa25, where original waveforms are prepared by the primary computation mode and are stored in the RAM 13 or 20 in advance. Further, the sound is actually reproduced when the stored waveform is read out at the sampling frequency 32 kHz, which is automatically determined. Thus, the waveform synthesizing is effected virtually with the waveform memory readout modes so that the minimum quality of the reproduced sound can be retained even if the low performance CPU is equipped in the system. After that, the process in step Sa22 is executed to switch the nonoperable state to the operable states and the procedure returns. On the other hand, if the backup waveform calculating mode is not specified in step Sa24, the procedure goes forward to step Sa26, in which a termination command for the sound synthesizing program is detected. If the termination of the sound synthesizing program is commanded the operation finishes, by clearing the flag SETFLG to "0" in step Sa27. In case that the calculated frequency Fs is smaller than 32 kHz, and the backup waveform calculation mode is neither specified nor the program termination is commanded, the warning alarm is continued. Thus, the waveform synthesizing is done with the computation devices such as the CPU 10. The sampling frequency fs is optimized with respect to the CPU performance. Further, if the performance of the CPU is low, the synthesizing is executed by switching to the waveform memory readout mode, which can reduce the CPU load.

For summary, the CPU-aided second waveform generator comprises a computerized waveform generator operable according to a given algorithm at a variable operation speed to create a digital waveform by successively computing sample values of the digital waveform. The computerized waveform generator is provisionally operated to carry out trim creation of a model digital waveform while measuring the operation speed at which the trial creation is carried out. The sampling frequency is optimally determined in comparable to the measured operation speed. The computerized waveform generator is actually operated to enable the same to successively compute sample values of a actual digital waveform at the determined sampling frequency according to the provided performance information. The sample frequency is fixed to one of stepwise predetermined levels, which is lower than and closest to the measured operation speed. When the determined sampling frequency falls below a critical level which is defined to ensure a minimal quality of the digital waveform, the initial algorithm is changed to raise the operation speed of the computerized waveform generator so that the sampling frequency can be redetermined to exceed the critical level. The algorithm is changed from a complicated one to a simplified one such that the computerized waveform generator operates based on the simplified one of the algorithm to successively read out prestored ones of sample values to reproductively create the digital waveform. The sample values may be initially computed by the complicated algorithm. Then, the sample values are stored in the waveform memory for actual use under the simple algorithm of the waveform memory readout mode. Thus, the inventive sound generating apparatus for creating a digital waveform to generate a musical sound according to performance information, comprises input means for providing performance information, computerized waveform generator means operable based on a given algorithm at a variable operation speed to create a digital waveform by successively computing sample values of the digital waveform, trial means for provisionally operating the computerized waveform generator to carry out trial creation of a model digital waveform while measuring the operation speed at which the trial creation is carried out, determining means for optimally determining a sampling frequency comparable to the measured operation speed, controller means for actually operating the computerized waveform generator to enable the same to successively compute sample values of an actual digital waveform at the determined sampling frequency, and output means for generating the musical sound based on the actual digital waveform according to the provided performance information.

Figure 8:
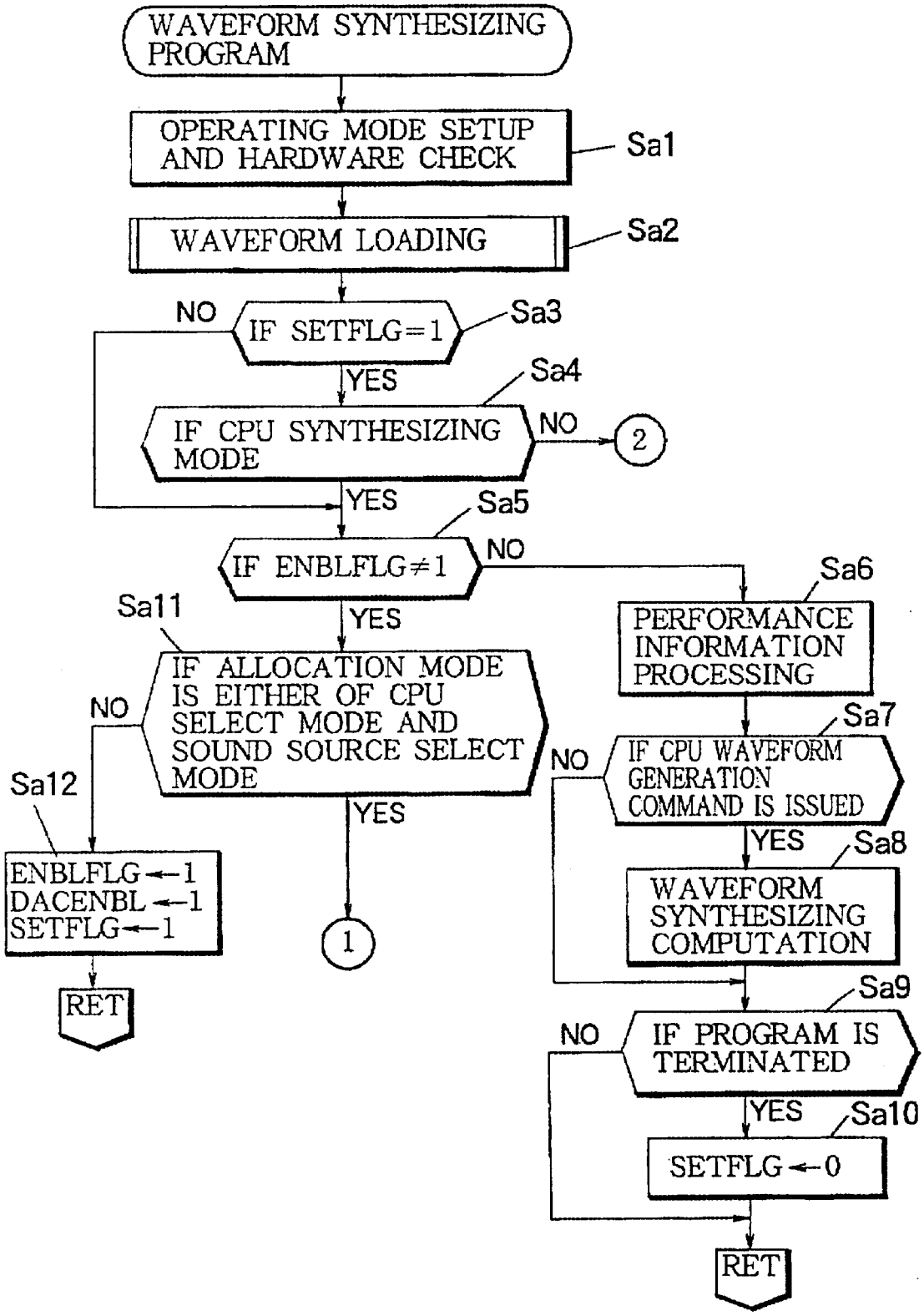
FIG. 8 is a flowchart illustrating a waveform synthesizing program executed in the first embodiment.
Figure 9:
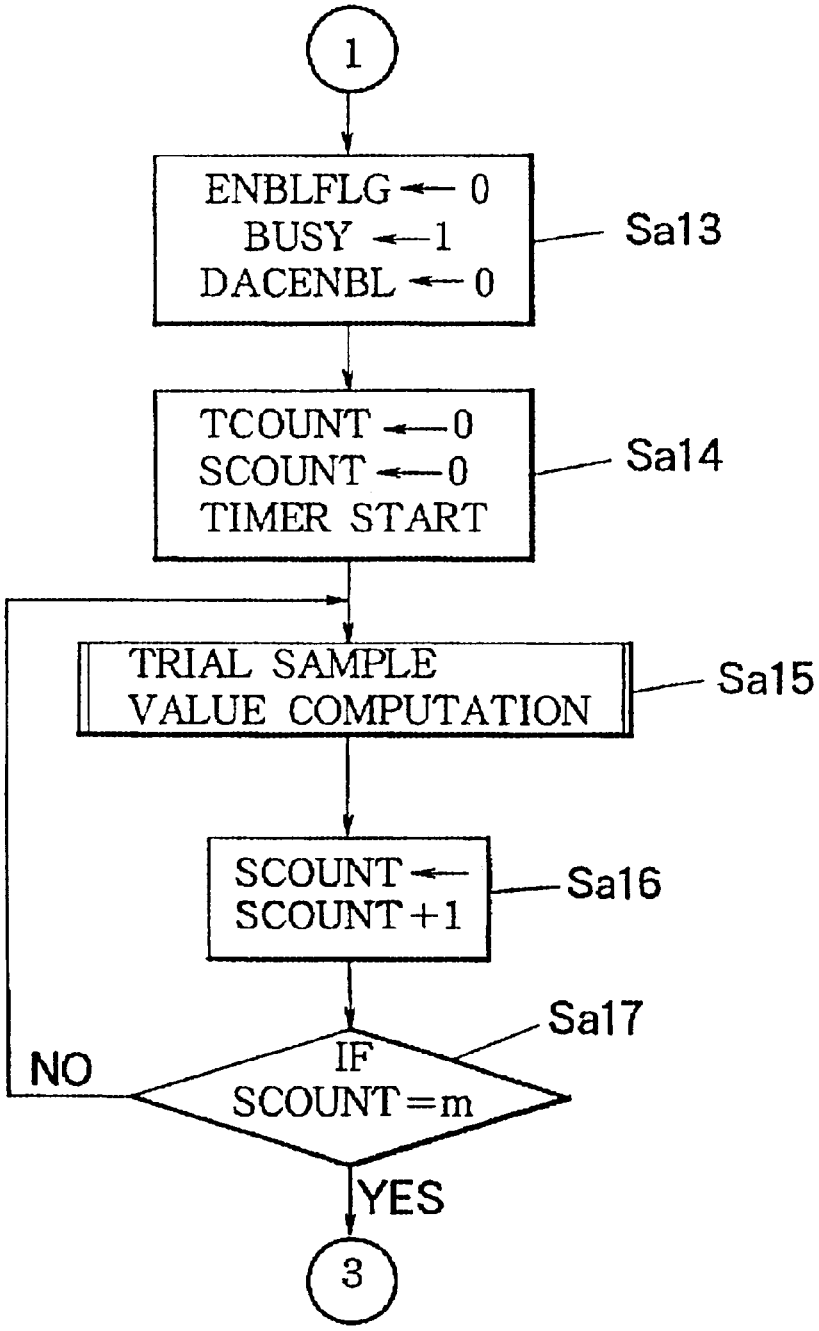
FIG. 9 is a flowchart illustrating the waveform synthesizing program executed in the first embodiment.

By the way, if there is detected a possible use of the hardware sound source device for the waveform synthesizing in step Sa4 in FIG. 8, the procedure branches to step Sa28 in FIG. 11. In step Sa28, the flag DACENBL is switched to "1" to enable the D/A converter 23 to output the sound. In step Sa29, any termination command for the sound synthesizing program is detected. If the termination of the sound synthesizing program is commanded, the synthesizing program finishes by clearing the flag SETFLG to "0" in step Sa31 through step Sa30. On the other hand, if the termination of the sound synthesizing program is not commanded, the operating mode is checked whether it is the sound source synthesizing mode or not in step Sa32, if the detection result of step Sa29 is negative. When the sound source synthesizing mode is detected in step Sa32, existence of the hardware required for the specified mode is detected in step Sa33. This mode is specified upon the recognition with the hardware check in step Sa1. If the relevant hardware exists,, the synthesizing procedure is executed by the relevant hardware in step Sa34. Otherwise, the lack of the relevant hardware is issued in step Sa35, and the synthesizing process is continued using the current hardware setup, if the relevant hardware does not exist. After steps Sa34 and Sa35, the procedure returns. The synthesizing processing with the selected hardware will be described later.

Figure 12:
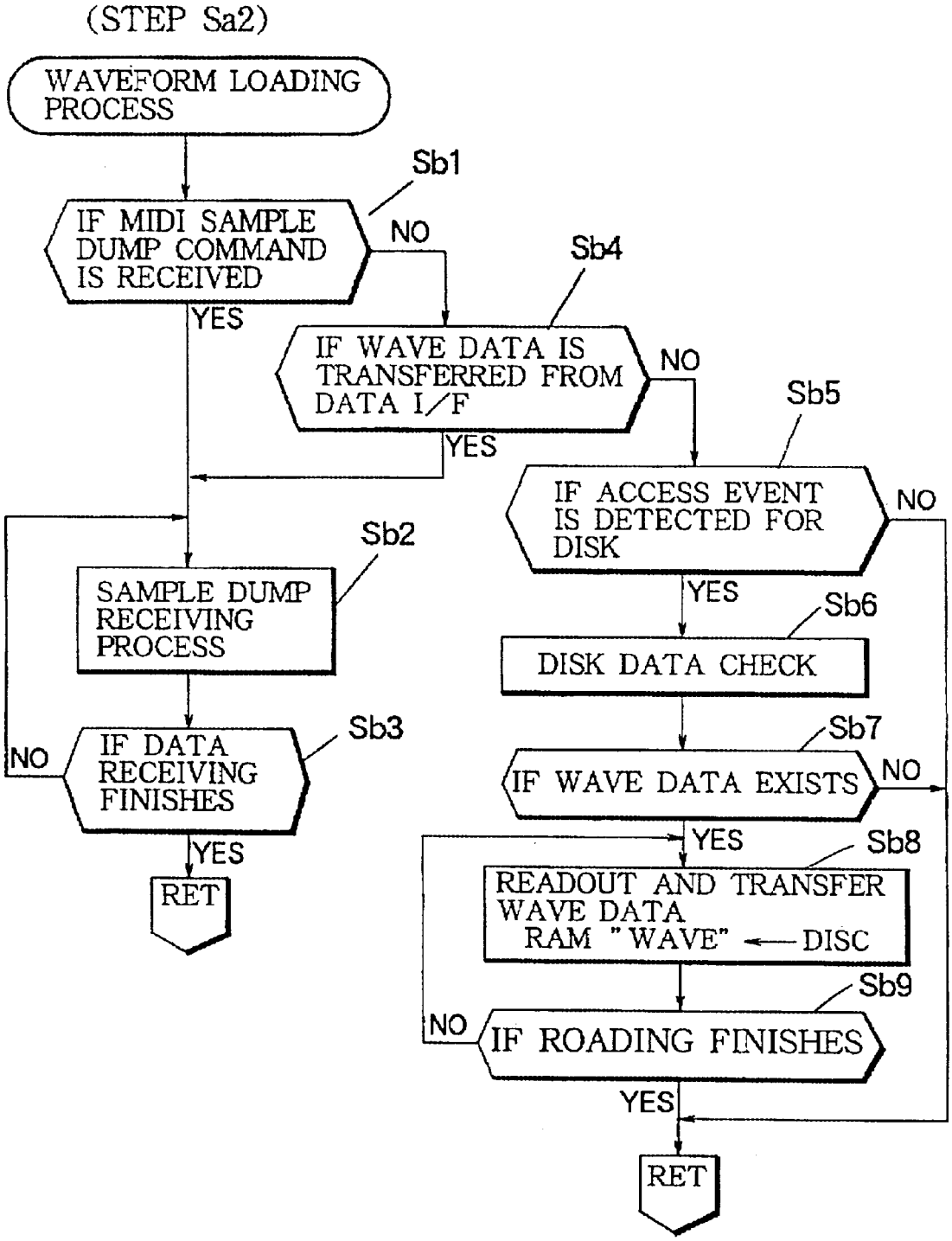
FIG. 12 is a flowchart illustrating the waveform sample value loading process executed in the waveform synthesizing program.

The waveform loading process executed in step Sa2 (FIG. 8) will be described hereunder with reference to FIG. 12. In the waveform loading process, it is detected whether a MIDI sample dump command is received through the multi I/O port 14 in step Sb1. The MIDI sample dump contains a wave data according to the MIDI standard, and is used in the waveform memory readout mode. If the MIDI sample dump is received, the sample receiving procedure is conducted such that the received data is transferred to the area WAVE in RAM 13 or 20 in step Sb2. The sample dump receiving of step Sb2 is repeated until all of the data reception are completed. The completion is detected in step Sb3. If all of the data reception are completed, the detection in step Sb3 results in "Yes", and the procedure returns. On the other hand, if the check of step Sb1 results in "No", it is checked if the wave data is transferred via the interface I/F in step Sb4. If the wave data is received, the received data is transferred to the area WAVE in the RAM 13 or 20 in steps Sb2 and Sb3, as in the case of the MIDI sample dump. If both the steps Sb1 and Sb4 result in "No", an access reading event for the storage unit 15, namely the request to read out some data from the storage unit 15, is detected in step Sb5. If the request is not issued, the waveform loading is terminated immediately and the procedure returns, since there is no more job to do. On the other hand, when the access event occurs, the data read out from the storage unit 15 is checked in step Sb6. Further, in step Sb7, it is tested whether the read out data is the wave data or not. If the read out data is not the wave data, the waveform loading is terminated immediately and the procedure returns, since there is no more job to do. Otherwise, if the wave data is read out, the wave data is transferred to the area WAVE in the RAM 13 or 20. The data transfer in step Sb8 is repeated until the end of the data transfer is detected in step Sb9. When the data transfer is completed, the check of step Sb9 results in "Yes" and the procedure returns. Thus, in the waveform loading, the wave data to be used in the waveform memory readout mode is received or read out. Then, the wave data is transferred to the area WAVE in the RAM 13 or 20. The computation devices such as CPU 10 process the wave data with the waveform memory readout mode according to a simple algorithm in order to synthesize the actual waveform. In order to reproduce the wave data loaded in the RAM 13 or 20 by the sound source 22, the loaded basic wave data might be transferred again to the waveform memory 25 included in the sound source 22. In a conventional musical sound generator having a specific hardware sound source, the hardware sound source must have a temporary waveform memory to receive the loaded wave data. The CPU must execute the wave data transfer from the RAM to the waveform memory. However, in the present embodiment, the basic wave data is loaded to RAM 13 or 20 under the control of the CPU 10. Therefore, it is not necessary to provide the temporary memory to hold the wave data in the hardware. Further, it is not necessary to execute re-loading process in which the loaded wave data is transferred further to the external hardware device. The costs for the system hardware of software can be reduced, and the time from the end of the wave data loading to the reproduction of the sound can be shortened.

Figure 13:
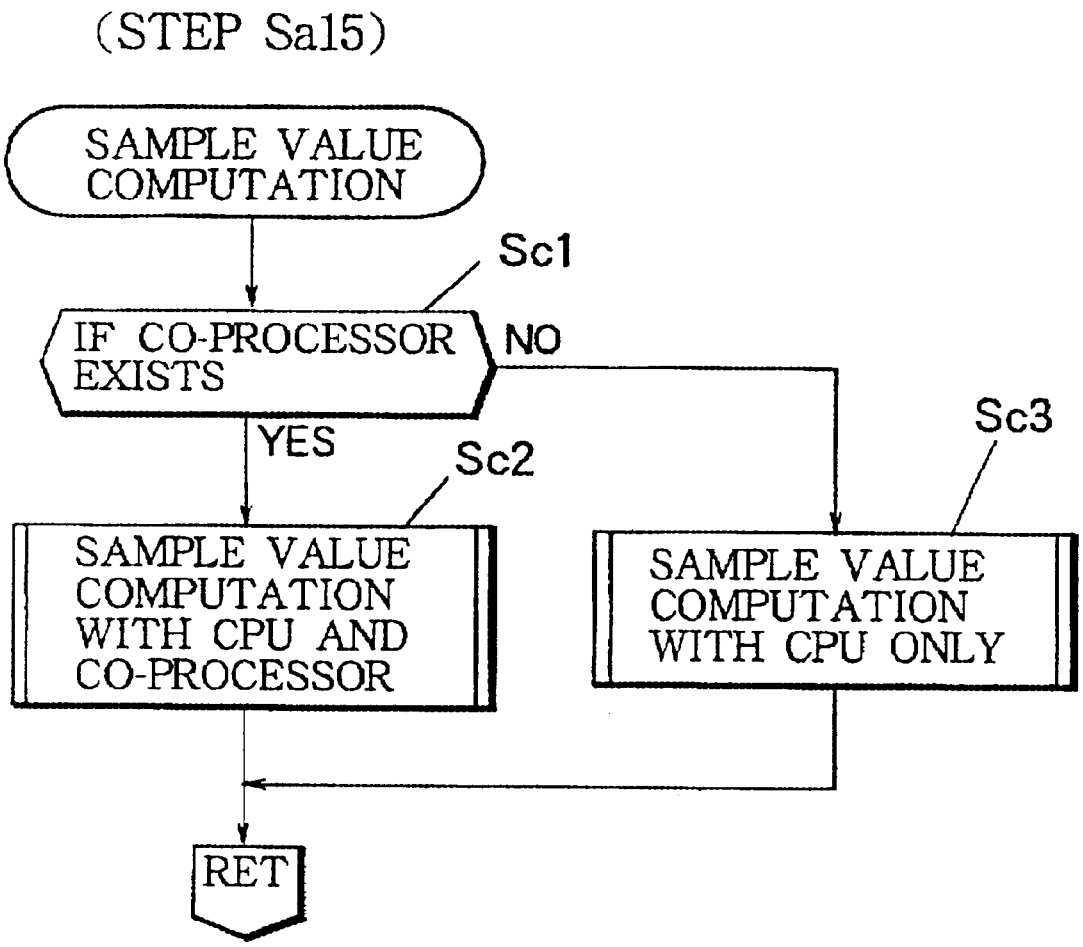
FIG. 13 is a flowchart illustrating the waveform sample value computation process executed in the waveform synthesizing program.

The sample value computing operation executed in step Sa15 (FIG. 9) will be explained hereunder with reference to FIG. 13. In step Sc1 of FIG. 13, it is tested whether the co-processor 17 exists. In the present embodiment, the co-processor 17 is installed. However, this device is optional and may be lacked in some hardware setup. If the CPU 10 accommodates an arithmetic operation unit equivalent to the co-processor 17, the detection of the co-processor is not required. It is possible to regard the system as if the co-processor is installed. If the co-processor 17 is detected, the sample value calculation is done with the CPU 10 as well as the co-processor 17 in step Sc2. Otherwise, the sample value calculation is carried out only with the CPU 10 in step Sc3, if there is no co-processor 17. After step Sc2 or Sc3, the procedure returns. The sample value calculation is the same in steps Sc2 and Sc3, except that the co-processor 17 is used or not. Thus, the detail of the sample value calculation is explained with respect to step Sc3 here.

Figure 14:
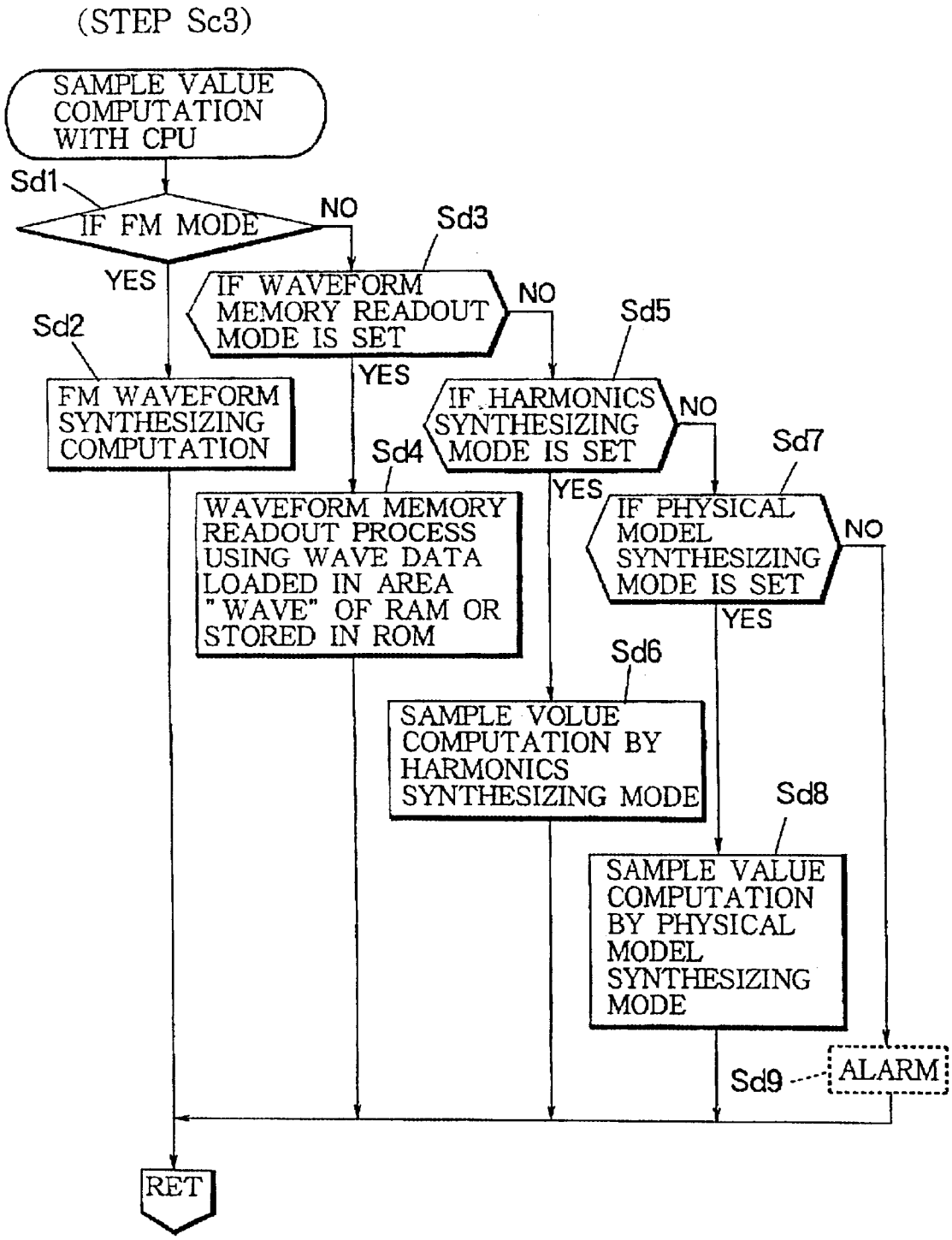
FIG. 14 is a flowchart illustrating the waveform sample value computation executed by CPU in the waveform synthesizing program.

In step Sd1 of FIG. 14, it is tested whether the current operating mode is set to the FM mode among the various CPU synthesizing modes. If the FM mode is set, a set of sample values corresponding to a number of channels are calculated at one sampling point according to the FM synthesizing method in step Sd2. For example, if polyphonic synthesizing is selected, a set of multiple sample values required for synthesizing a desired number of voices are calculated. In this case, the load of the CPU 10 is high, since various voices having various pitches may be concurrently created. Even worse, other processing such as graphics processing may be done in parallel. If the FM mode is not detected in step Sd1, it is detected whether the current operating mode is set to he waveform memory readout mode among the CPU synthesizing modes in step Sd3. If the waveform memory readout mode is detected here, a set of sample values required for one sampling point are read out from the waveform memory. In polyphonic synthesizing, multiple samples required for synthesizing a desired number of voices are read out. This data reading and data transfer is not carried out by the CPU 10, but by the DMAC 19. The wave data has been loaded to the area WAVE in the RAM 13 or 20, or provisionally stored in the ROM 11. If the waveform memory readout mode is not detected in step Sd3, it is detected whether the current operating mode is set to the harmonics synthesizing mode among the various CPU synthesizing modes in step Sd5. If the harmonics synthesizing mode is detected, a set of sample values required for one sampling process are calculated by the CPU 10 according to the harmonics synthesizing method in step Sd6. In polyphonic mode, a number of samples required for synthesizing a desired number of voices are calculated with the harmonics synthesizing method. In this case, the load of the CPU 10 is high, since various voices having various pitches may be created concurrently. Even worse, other processings may be carried out in parallel, similarly to the situation under the FM mode. If the harmonics synthesizing method is not detected in step Sd5, it is tested whether the current operating mode is set to the physical model synthesizing mode among the various CPU synthesizing modes in step Sd7. If the physical model synthesizing mode is detected, samples required for one sampling point are calculated by the CPU 10 according to the physical model synthesizing method in step Sd8. In polyphonic mode, a number of sample required for synthesizing a desired number of voices are calculated with the physical model synthesizing method. If the physical model synthesizing mode is not detected in step Sd7, the current operating mode is out of the present embodiment, so that the warning for the wrong mode setting is executed in step Sd9 as well as other process. After steps Sd2, Sd4, Sd6, Sd8, or Sd9, the procedure returns, and then the following step Sa16 (FIG. 9) is executed.

As for the waveform sample value calculation with the CPU 10 and the co-processor 17 executed in the step Sc2, the procedure shown in FIG. 14 is executed with cooperation of the CPU 10 and the co-processor 17 so that the calculating operation can be made faster. The detailed explanation for the operation is omitted here, since the procedure is basically the same as the calculation only by the CPU.

Thus, in the waveform sample value calculation in step Sa15, the most influential processing on the quality of the synthesized sound is carried out by one of the CPU synthesizing modes. In the FM, harmonics synthesizing, or physical model synthesizing mode, the time required for the wave data calculation, as well as the number of voices to be reproduced simultaneously, is the bottle neck of the sound synthesizing. The wave data at each sample point is actually calculated in order to examine the processing power. The calculation is repeatedly done in steps Sa15 to Sa17 for m cycles, and the time required for the m sample calculation is measured by the timer operation to set the sampling frequency fs suitable for the processing power of the CPU in step Sa21. Similarly in the waveform memory readout mode, the readout operation of the wave data is the bottle neck of the sound synthesizing, so that the wave data at each sample point is read out to examine the accessing speed. The readout process is done in steps Sa15 to Sa17 for m samples, and the time required for the m sample calculation is measured by the timer operation to set the sampling frequency fs suitable for the processing power of the CPU in step Sa21.

The synthesizing by the selected hardware, which is executed in the above-described step Sa34 (FIG. 11), is explained hereunder. This synthesizing process is effected unless voices of all the channels are synthesized by the CPU synthesizing mode alone. This process is executed to control the sound source device used for synthesizing the waveform according to the allocation mode. First of all in this procedure, event detection is carried out in step Se1 of FIG. 15. The event includes a key-on event issued in response to keyboard information KBD or MIDI information, and includes other events not only associated to the CPU synthesizing mode, but also associated to the sound source device mode. Upon detecting the key-on event, the apparatus initiates the synthesizing process. In step Se2, it is tested whether the current operating mode designates the sound source synthesizing mode or not. If the detection result is "No", the procedure branches to step Se11. Otherwise, the procedure goes forward to following step Se3, if the detection result is "Yes". In step Se3, it is tested whether the current synthesizing operation status of the sound source devices and the performance information corresponding to the event comply with a "condition" for synthesis of waveform by the sound source device. In the present embodiment, one condition is whether the number of voices (timbres) to be synthesized currently is within a maximum number of voices which can be synthesized simultaneously by the hardware device specified in the sound source synthesizing mode. More particularly, in step Se3, the number of channels currently being in active status and being allocated for the sound source device is less than or equal to the full number of the channels which can be used for simultaneous synthesis of voices by the device. The "condition" may include other factors listed hereunder: (1) Whether a "pitch" or a "touch" specified by the detected event is higher (or lower) than a predetermined value. (2) Whether a value relevant to "timbre" specified by the detected event is higher (or lower) than a predetermined value. (3) Whether a value relevant to a number of "parts" in the performance information specified by the detected event is higher (or lower) than a predetermined value. (4) Whether a detected MIDI-CH value (number of channels) relevant to the detected event is higher (or lower) than a predetermined value. As shown above, the criteria for the "condition" may be generalized as whether a certain value specified by the performance information is higher (or lower) than a predetermined value. It is possible to implement a particular "condition" to issue a negative result if some unique timbre is specified to be synthesized in the FM mode or the harmonics synthesizing mode using the sound source device. This implementation will be described later in another embodiment. If the "condition" is fulfilled, channel assignment process is conducted in step Se4 such that a channel to synthesize a voice for the key-on event is allocated out of vacant channels in the sound source device, which are currently not used for synthesizing the sound. In step Se5, the sound generation is executed using the specified sound source hardware, in which the actual synthesizing of the waveform is done for the issued event in the allocated channel.

If the "condition" is not fulfilled in step Se3, it is tested whether the flag ENBLFLG is "1" or not in step Se6. In .this stage, the value "1" of the flag ENBLFLG indicates that the steps Sa13 to Sa25 have been executed already, and indicates that the sampling frequency fs for the CPU synthesizing mode is already set up. Thus, the CPU synthesizing mode is available. Therefore, if the test result of step Se6 is "Yes" because of value "1" of the flag ENBLFLG, voice allocation procedure to the CPU synthesizing mode is executed in step Se7 so that the synthesizing of the waveform relevant to the event which does not comply with the condition for synthesizing by the sound source device is carried out by the CPU synthesizing mode. Particularly, an allocation command is issued to calculate sample values of the waveform relevant to the event in this CPU synthesizing allocation procedure. The command includes designation of computation mode to be executed by the CPU 10 (any mode out of the CPU synthesizing modes), and designation of the timbre, pitch, touch, volume and channel assignment. Further, the command includes note commands such as key-on or key-off. During the allocation command is valid, the computation devices including the CPU 10 execute the waveform synthesizing computation process in order to generate the sample values relevant to the event in step Se10. The allocation command also includes information about the start and end of interrupts, if the waveform is generated with the interrupt process. On the other hand, if the value "0" of flag ENBLFLG is detected in step Se6, the CPU synthesizing mode is not available. In this case, truncating process is carried out to turn off sound reproduction operation of a channel which is the oldest in step Se8, to make a vacant channel forcibly. This truncating process may be included in the allocation process executed in step Se4. In step Se4, the relevant event is allocated to the vacant channel made by the forcible note-off, and the synthesizing of the waveform relevant to the event is carried out by the allocated channel in step Se4. If multiple sound source devices are installed to the system, channels of the different sound source devices may be allocated to synthesize a single timbre.

Figure 16:
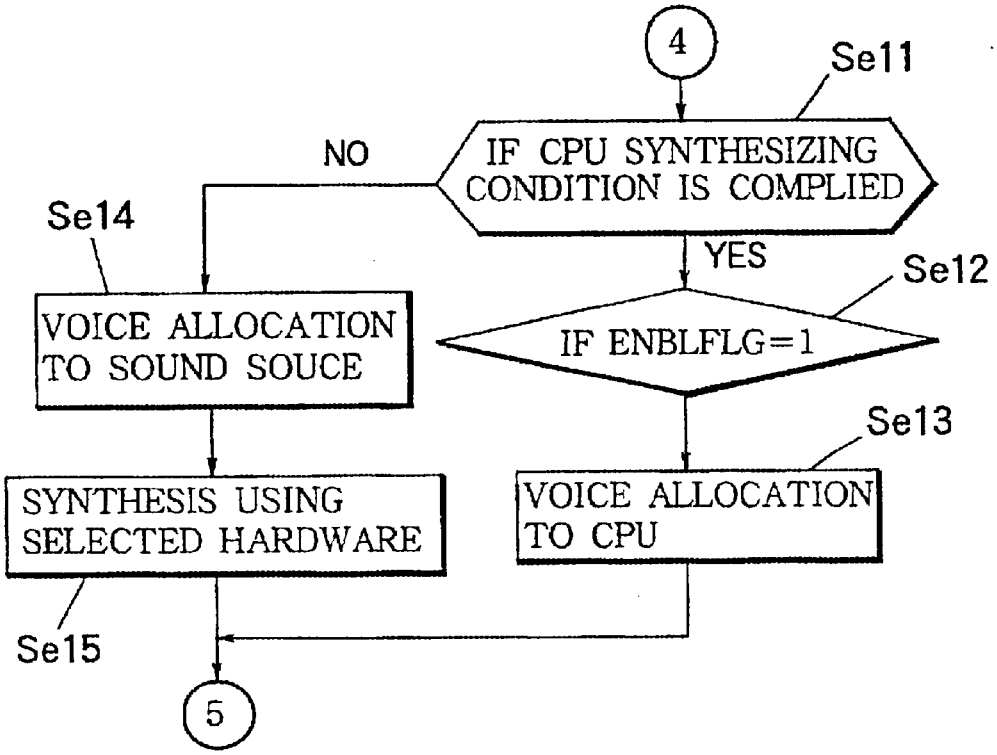
FIG. 16 is a flowchart illustrating the synthesizing process by the selected hardware in the waveform synthesizing program.

By the way, if the sound source device select mode or preceding mode is not detected in step Se2, there may be the CPU select preceding mode or the manual mode in which the CPU synthesizing mode is set together with the sound source synthesizing mode. Thus, the procedure branches to step Se11 in FIG. 16. In this step Se11, it is tested whether the current state of the CPU synthesizing mode and the performance information relevant to the issued event comply with the "condition" for synthesizing by the devices including the CPU. Various factors may be conceived as the "condition" for synthesis by CPU as in the case of the "condition" for synthesis by the sound source device (step Se3). In this embodiment, the condition is whether a number of voices (timbres) to be synthesized currently is within a maximum number of voices which can be synthesized simultaneously with the CPU synthesizing mode. More particularly, in step Se11, it is tested whether the number of channels (CH) currently being held in note-on status and being allocated for the computation devices including the CPU is less than or equal to the maximum number of the channels which can be used for simultaneous synthesizing of the waveforms by the CPU synthesizing mode. If the "condition" is satisfied, it is tested whether the flag ENBLFLG is "1" or not in step Se12. As described above, the value "1" of the flag ENBLFLG here indicates that the synthesis of the waveform by the CPU synthesizing mode is ready to be started. Therefore, the allocation procedure is executed for the waveform synthesis by the devices including the CPU 10 in step Se13, and the procedure further goes forward to step Se9. The detail of the allocation procedure in step Se13 is not explained here again, since the procedure is eventually the same as in step Se7. On the other hand, if the "condition" for synthesis of the waveform by CPU is not complied in step Se11, or the devices including the CPU 10 are not ready in step Se12, the allocation procedure is executed in step Se14 as in step Se4, so that the processing relevant to the event is done by the external sound source device. The synthesizing using the specified hardware is done in step Se15 as in step Se5. After step Se13, steps Se9 and step Se10 are executed. In step Se9, it is detected whether the allocation command exists to generate wave data by the CPU. If the command is not detected, the procedure returns immediately. Otherwise, the waveform is calculated according to the allocation command to generate sound by the CPU in step Se10.

Thus, in the external sound source select preceding mode, the synthesizing process complying with the "condition" for synthesis by the hardware device is executed by the sound source in step Se5, while the synthesizing process which does not comply with the "condition" is executed by the CPU 10 in step Se10. On the other hand, if the designated mode is not the sound source preceding select mode, the process complying with the "condition" for synthesis by the CPU 10 is executed by the software module in step Se10, while the synthesizing process which does not comply with the "condition" for synthesis by the CPU is executed by the hardware sound source device in step Se15. Thus, in the synthesis using the selected hardware, if the synthesizing process exceeds the processing power of the hardware specified in the sound source synthesizing mode, the exceeding part of the process is executed by the CPU synthesizing mode, so that it is possible to synthesize a plurality of voices more than the full number of voices which can be simultaneously reproduced in the hardware without enhancing hardware setup. In general, when the input device such as the I/O 14 provides performance information effective to command concurrent generation of a plurality of musical sounds, the inventive apparatus designates one of the first waveform generator and the second waveform generator according to a number of concurrent musical sounds specified by the performance information such that the designated one has a capacity sufficient to create a number of waveforms corresponding to the number of the musical sounds. When the number of the concurrent musical sounds exceeds a capacity of either of the first waveform generator and the second waveform generator, both of the first waveform generator and the second waveform generator are designated to ensure complete generation of the concurrent musical sounds.

Figure 17:
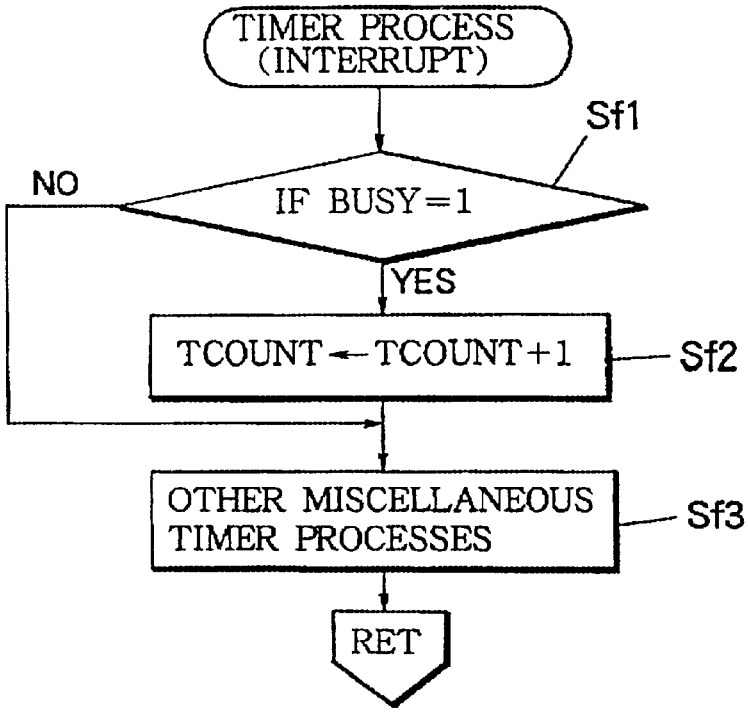
FIG. 17 is a flowchart illustrating a timer process in the waveform synthesizing program.

The timer process will be described hereunder. The timer process is an interrupt process executed at a predetermined interval Tt during the trim waveform synthesis program described before. FIG. 17 is a flowchart illustrating the timer process in detail. In step Sf1, it is tested if the flag BUSY is "1", which means that the counting up of the timer is enabled. If this detection results in negative, the procedure skips to Sf3. Otherwise, the routine goes forward to step Sf2, where the register TCOUNT is incremented by "1" if the detection result is positive. In step Sf3, other miscellaneous timer processes are executed to finish the timer routine. Thus, the timer process increments the register TCOUNT by "1" if the flag BUSY is "1". The flag BUSY switches to "1" only in the loop of steps Sa9 to Sa11 so that the content of the register TCOUNT indicates the invocation cycles of the timer process within the timer required for the computation or reading of one waveform. The lapse time can be derived by multiplying TCOUNT by Tt.

In the arrangement shown in FIG. 1, all the optional devices such as the co-processor 17, DSP 21 and external sound source 22 are fully installed. Thus, in this arrangement, all the operating modes can be designated with respect to the synthesizing mode and the allocation mode. If the operating mode is set to the sound source select mode at first priority, a part of the process exceeding the processing power of the external sound source is allocated to the CPU, and the CPU handles the process so that the musical sound can be generated beyond the limitation of the external sound source device, and various timbres can be generated.

Further, various timbres can be generated also in the CPU select mode given first priority. Since the sampling frequency fs is always set to the optimum value at step Sa21, the quality of the generated sound can be maintained high.

In the embodiment described above, the optional devices are fully installed as shown in FIG. 1. However, the hardware setup of the personal computer or the electronic musical instrument varies depending on which optional device is installed. The available operating mode of the musical sound synthesizing program is different depending on the hardware setup. The operations of the musical sound synthesizing program in other hardware arrangements which are different from that in FIG. 1 will be described hereunder.

Figure 21:
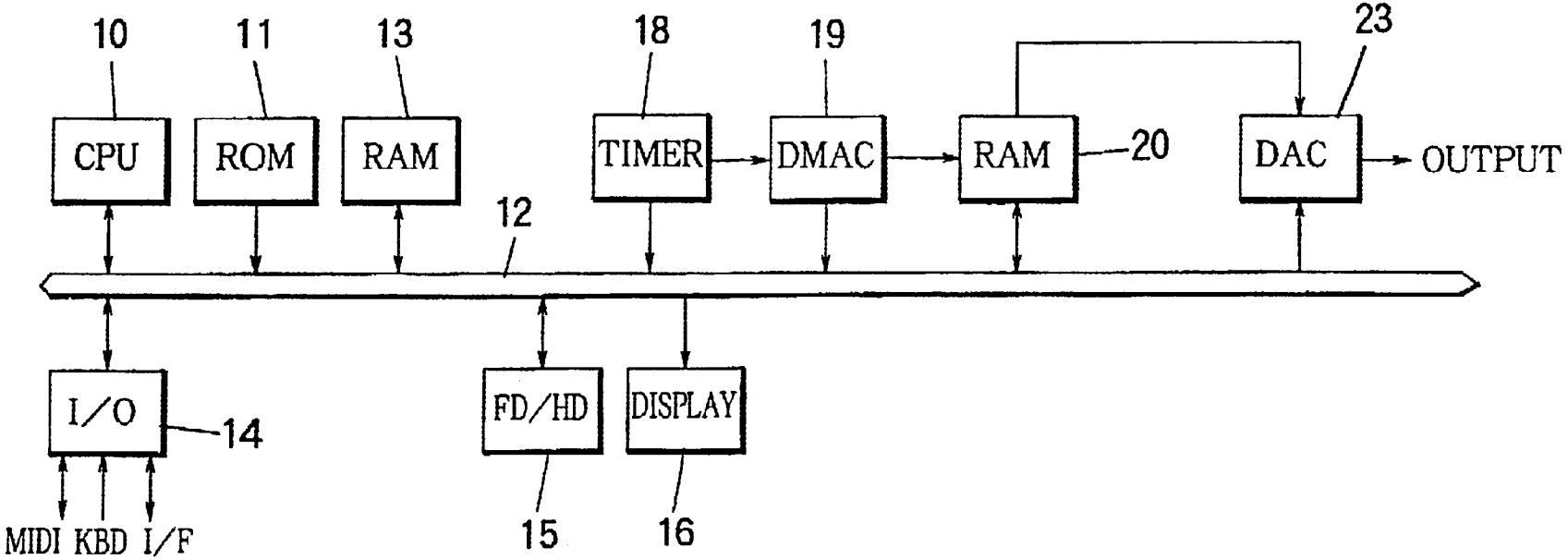
FIG. 21 is a schematic block diagram illustrating a variation to which the present invention is applied.

The hardware setup shown in FIG. 21 lacks all the optional devices including the co-processor 17, DSP 21, and LSI sound source 22. Of course, the sound source synthesis mode is not available in this setup, because the detection in step Sa4 (FIG. 8) becomes "Yes", and only the CPU synthesizing mode can be utilized. However, if the processing power of the CPU 10 is not very high enough, the real-time wave data computation is impossible, since both of the co-processor 17 and DSP 21 are not installed. Thus, there may be a situation in which the waveform memory readout mode is only available in the CPU synthesizing modes.

Figure 22:
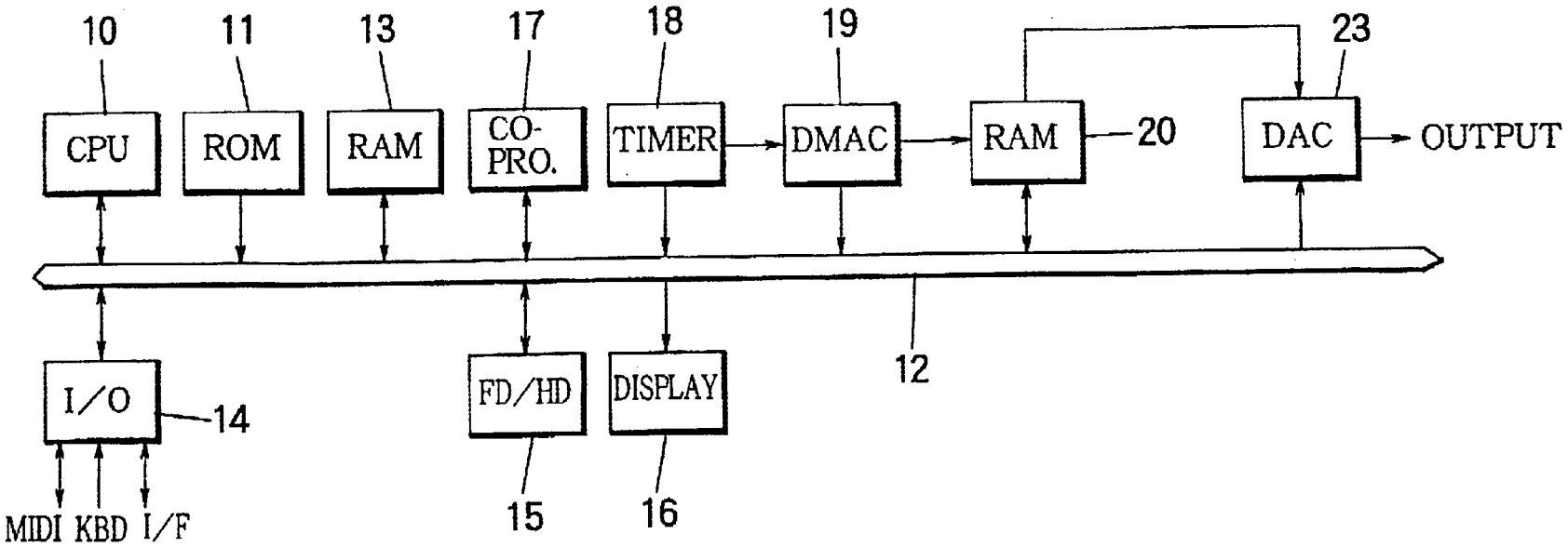
FIG. 22 is a schematic block diagram illustrating another variation to which the present invention is applied.

The hardware setup shown in FIG. 22 has only the co-processor 17 as an optional device. In this setup, the hardware sound source synthesis mode is not affordable, because the detection in step Sa4 (FIG. 8) becomes "Yes". The CPU synthesizing mode is only available. However, all the CPU synthesizing modes are possible, because high speed real time arithmetic operations are possible by the co-processor 17. The actual waveform calculation (step Sa9), as well as the trial waveform calculation (step Sa15), is executed by both of the CPU 10 and the co-processor 17 in this setup, since the co-processor 17 is available.

Figure 23:
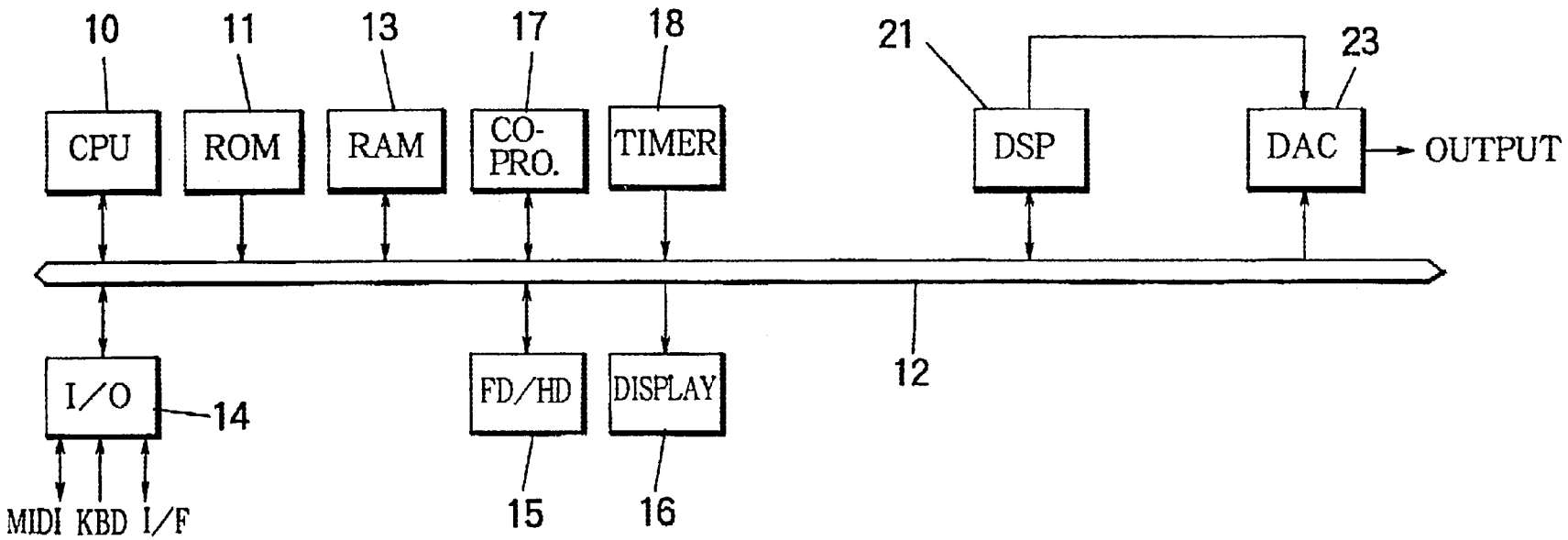
FIG. 23 is a schematic block diagram illustrating a further variation to which the present invention is applied.

The hardware setup shown in FIG. 23 includes the co-processor 17 and the DSP 21 as optional devices. The purpose of the DSP 21 is to ensure high speed calculation of the wave data. If the DSP 21 is treated as the external sound source, the sound source synthesis mode is available by means of the DSP on the second invocation of the synthesizing program or thereafter, since the detection in step Sa4 (FIG. 8) becomes "No". However, the purpose of the DSP 21 is to facilitate data calculation, so that the wave data is not generated by the waveform memory readout method, but is generated by the various pure arithmetic modes such as FM mode, harmonics synthesis mode and physical modeling mode. Further, the CPU synthesizing mode is available depending on the allocation mode. The wave data calculation is possible, but the waveform memory readout mode is not available since the DMAC 19 and RAM 20 are deleted. It is possible to utilize only the FM mode, harmonics synthesizing mode, and physical model synthesizing mode, where the real-time high speed wave data calculation is executed. The actual waveform calculation (step Sa8), as well as the trial waveform calculation (step Sa15), is executed by both of the CPU 10 and the co-processor 17 in this setup.

Figure 24:
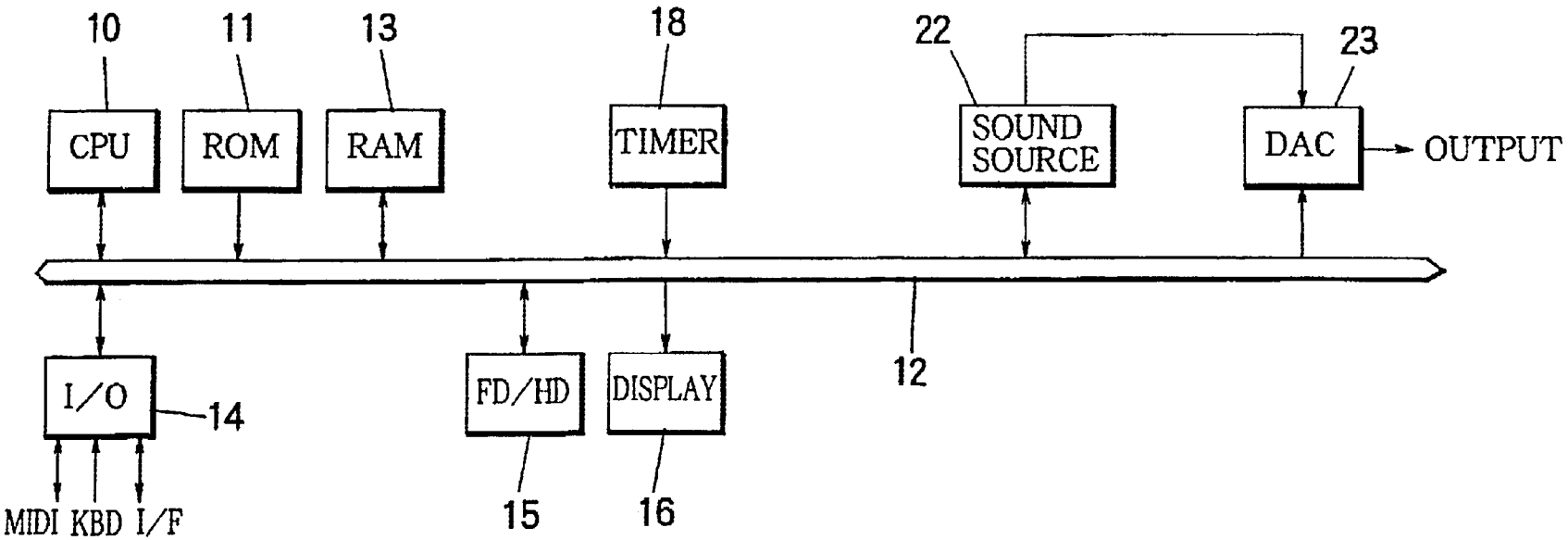
FIG. 24 is a schematic block diagram illustrating a still further variation to which the present invention is applied.

The hardware setup shown in FIG. 24 includes only the LSI sound source 22 as an optional device. In this setup, the sound source synthesis mode is available on the second invocation of the synthesizing program or thereafter, since the detection in step Sa4 (FIG. 8) becomes "No". Further, the CPU synthesizing mode is available depending on the allocation mode. However, there may be a situation in which the waveform memory readout mode cannot be utilized, since DMAC 19 and RAM 20 are missing. Further, if the processing power of the CPU 10 is not very high enough, the real-time wave data calculation is impossible since the co-processor 17 lacks. Thus, there may be a situation in which all the CPU synthesizing modes are not available.

A second embodiment will be explained hereunder. Generally, it is difficult to reproduce the realistic sound of the percussive tones such as a rhythm or drum instrument by the wave data computation according to FM mode or harmonics synthesizing method. Thus, if the LSI sound source 22 is installed and this sound source 22 calculates the wave data of the musical sound by the pure calculating method such as FM mode other than the waveform memory readout mode, it is not adequate to reproduce the sound by the LSI sound source 22. Further, it is not necessary to calculate the wave data by the arithmetic calculating mode other than the waveform memory readout mode by the CPU 10, if this sort of the LSI sound source 22 is installed. Further, the CPU 10 should execute jobs other than the waveform synthesizing, so that a system load required for the execution of the waveform synthesizing program should be reduced as much as possible, especially in case that the processing power of the CPU 10 is not high. Thus, in this situation, it is convenient that the CPU to generates the percussive wave data unsuitable for the LSI sound source 22 by the waveform memory readout mode, while the LSI sound source 22 generates the wave data for other timbres. Thus, the computation load can be reduced for the CPU 10, and the LSI sound source 22 does not have to synthesize any wave data for which the sound source 22 has poor ability. The quality of the reproduced sound can be maintained high as much. The purpose of the second embodiment is directed to the very point. The second embodiment assumes that the sound source 22 is installed as shown in FIG. 1 or 24. With respect to the waveform synthesizing program, the synthesizing process using the selected hardware (FIGS. 15 and 16) is replaced with the process shown in FIG. 18. More particularly, the synthesizing process using the selected hardware in step Sa34 (FIG. 11) is substituted for the process shown in FIG. 18. The substituted process will be described hereunder, while omitting the explanation of the other processes for avoiding duplicated description.

Figure 18:
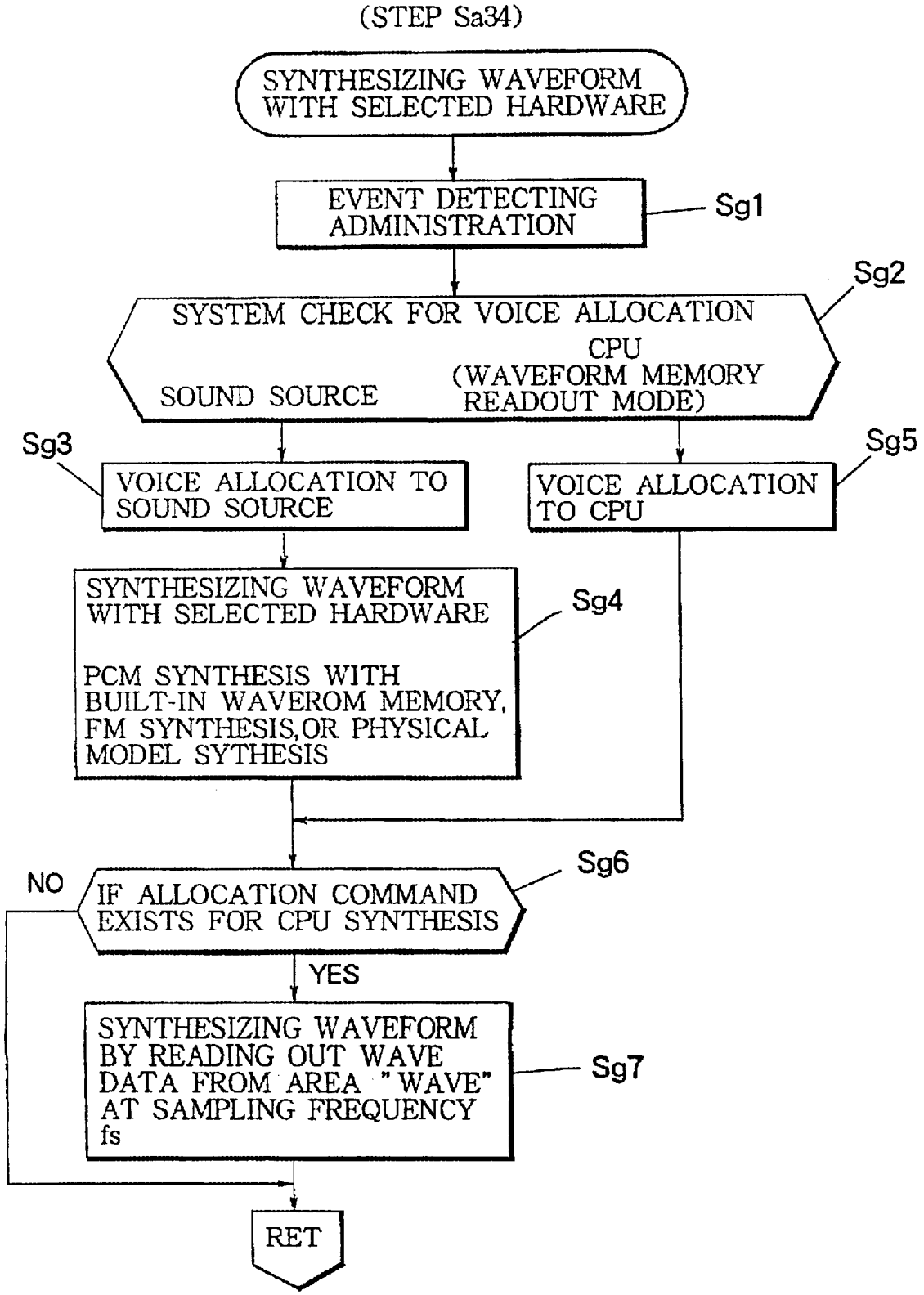
FIG. 18 is a flowchart illustrating a synthesizing process by a selected hardware in a second embodiment.

In this second embodiment, upon advancing forward to step Sa34, the program runs to execute the synthesizing process using the selected hardware as shown in FIG. 18. In step Sg1, the event detection is carried out as in step Se1. In step Sg2, system check for voice allocation is executed. More particularly, a device to handle the synthesis is determined for each voice (timbre) out of the CPU and the LSI sound source. The criteria for this allocation will be described hereunder. Generally, the sound source has unique disposition of available timbres, so that an individual timbre can be specified by a unique timbre code. Thus, it is possible to implement a table containing the list of the timbre codes of the percussive tones in advance, in order to discriminate between the tones to be handled by the CPU 10 in case that the timbre code detected for the relevant event is found in the table, and the other tones to be handled by the LSI sound source 22. However in the present embodiment, the allocation criteria may not be limited to the timbre code. It is possible to setup timbre handling means under the manual mode, in such a manner that a certain timbre is to be handled by the CPU, and another timbre is to be handled by the sound source. Each tone can also be allocated depending upon the number of the channels which can be used for simultaneous synthesizing. Further, under a compulsory mode, each tone can be allocated forcibly by other running programs.

Figure 15:
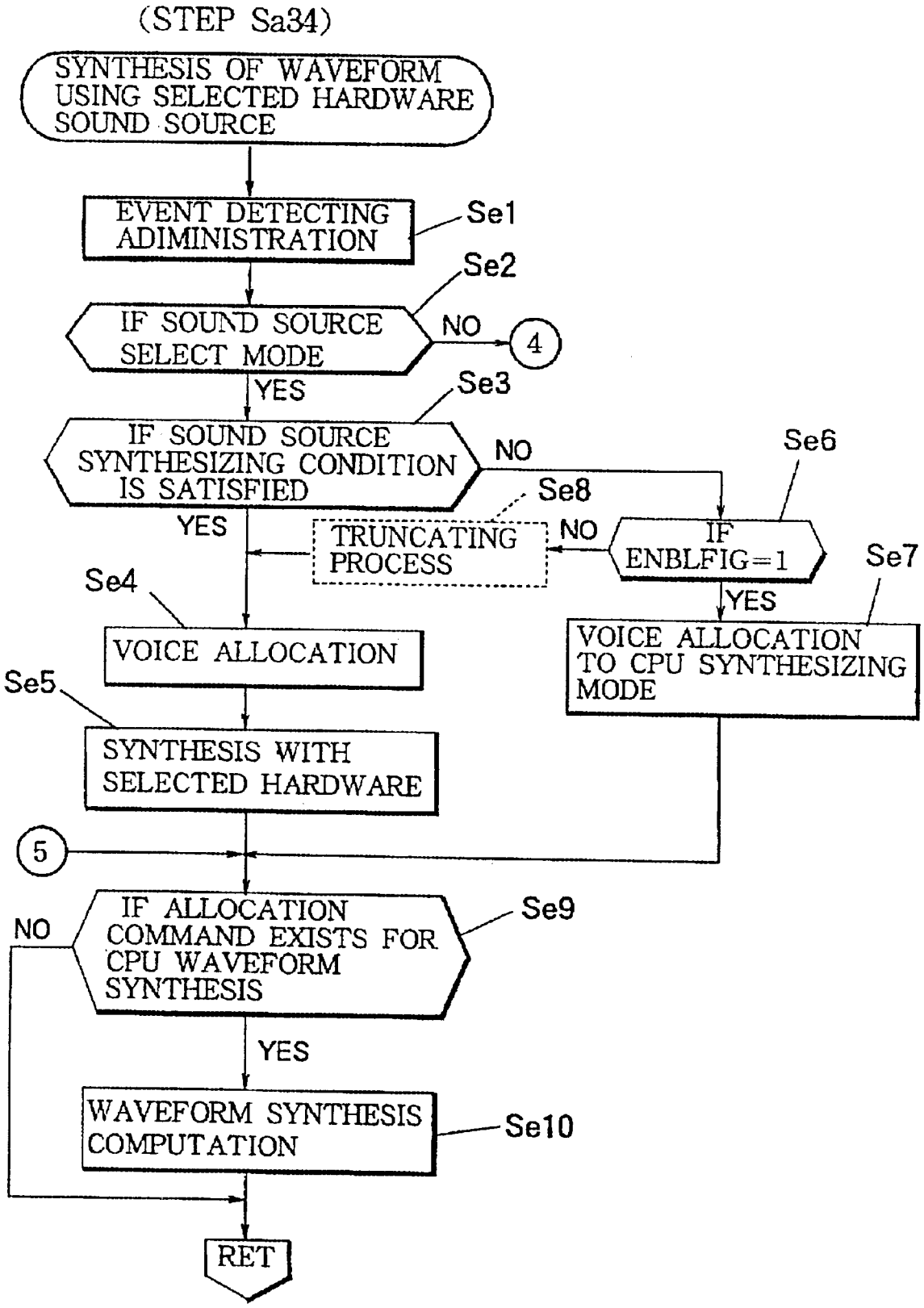
FIG. 15 is a flowchart illustrating the synthesizing process by a selected hardware in the waveform synthesizing program.

For the tones allocated to the LSI sound source, vacant channels are created by the voice allocation process in step Sg3 as in step Se4 (FIG. 15). In step Sg4, the waveform relevant to the key-on event is synthesized through the vacant channels. The synthesizing method for this operation is not limited to the FM mode, the harmonics synthesizing mode or the physical modeling mode, but it is possible to use, for example, PCM mode to read out the wave data from the waveform memory 25, depending upon the characteristics of the installed sound source 22. On the other hand, for the timbres allocated to the CPU, the CPU synthesizing allocation procedure is done in order to generate an allocation command to generate wave data relevant to the detected event in step Sg5 as in step Se7 (FIG. 15). If the allocation command is available, the detection in step Sg6 results in "Yes", and the synthesizing calculation is step Sg7 is executed to generate a waveform relevant to the allocation command. The synthesis of the waveform is effected by the waveform memory readout mode in order to reduce the load for the CPU as described before. On the other hand, when the allocation command is not available, the detection in step Sg6 results in "No", and the procedure returns.

In this second embodiment, musical sounds can be allocated selectively to the CPU and the sound source according to their timbres so that the optimum distribution of the processing load for the CPU and the sound source is possible, and the various timbres can be generated while retaining the quality of the reproduced sounds. For summary, the input device provides performance information which contains timbre information effective to specify a timbre of the musical sound and timing information effective to specify a timing of generation of the musical sound. One of the first waveform generator and the second waveform generator is designated in correspondence with the timbre information so that the output device generates the musical sound having the specified timbre at the specified timing.

In the first and second embodiments, the synthesizing process for one tone is executed in the channels provided on the CPU or in the other channels provided in the sound source. However, the synthesizing process for a tone can be executed by both of the CPU and the sound source. In this arrangement, it is possible to use the harmonics synthesizing mode in the CPU side, and to use a mode other than the harmonics synthesizing, e.g., the FM mode in the sound source side, so that variational tones can be generated because the same tone is synthesized by the different calculation modes. The purpose of a third embodiment is directed to the very point. In the third embodiment, the LSI sound source is assumed to be installed in the system as shown in FIGS. 1 and 24. With respect to the waveform synthesizing program, the synthesizing process using the selected hardware device (FIGS. 15 and 16) is replaced with the process shown in FIG. 19. More particularly, the synthesizing process using the selected hardware in step Sa34 (FIG. 11) is substituted for the process shown in FIG. 19. The substituted process will be described hereunder, while omitting the explanation of the other processes for avoiding duplicated description.

Figure 19:
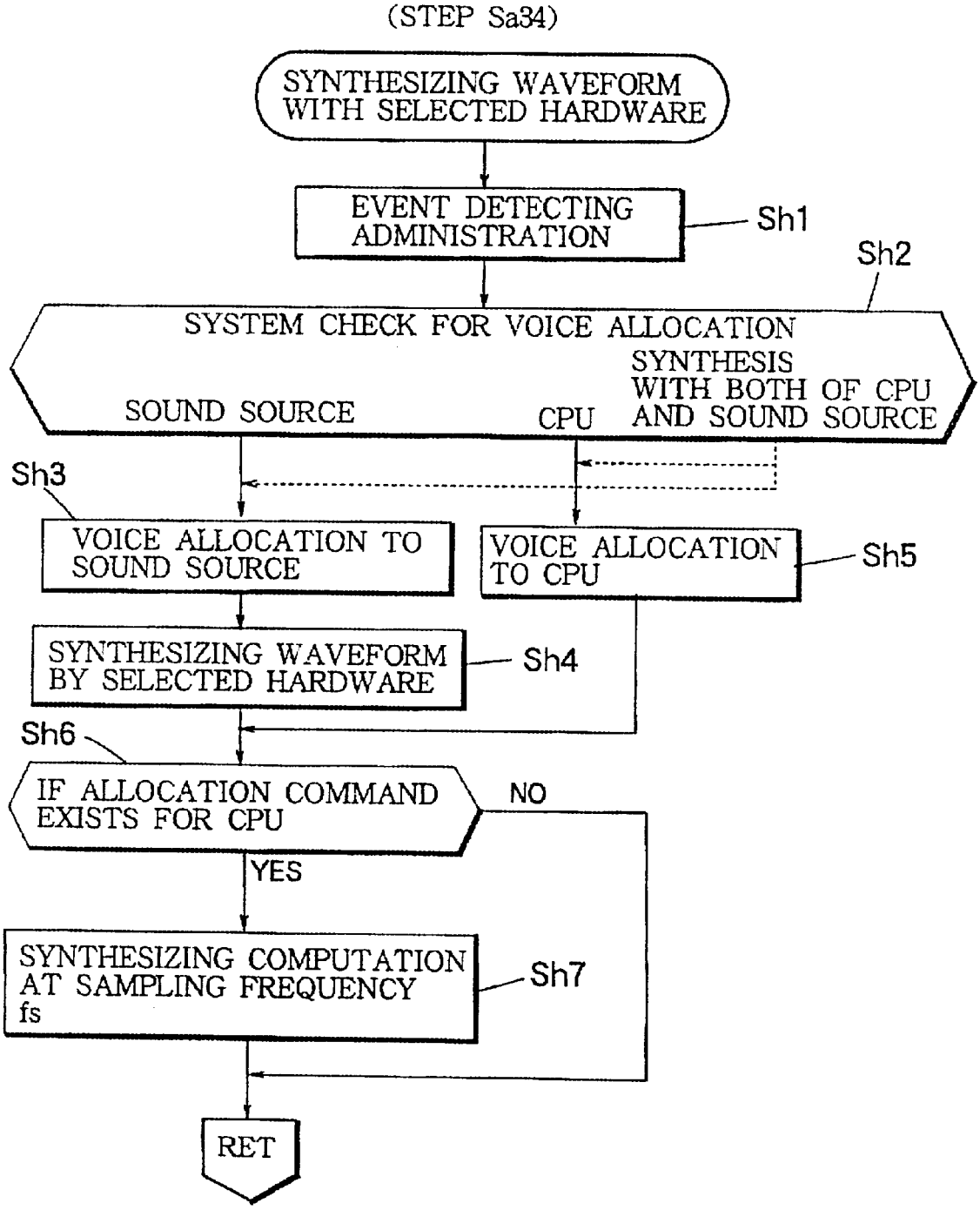
FIG. 19 is a flowchart illustrating a synthesizing process by a selected hardware in a third embodiment.

In this embodiment, upon advancing forward to step Sa34, the synthesizing program runs to execute the synthesizing process using the selected hardware as shown in FIG. 19. In step Sh1, the event detection is carried out as in steps Se1 and Sg1. In step Sh2, system check for voice allocation is executed. More particularly, a device to handle the synthesis is determined for each voice (tone) out of the CPU and the LSI sound source. The criteria for this allocation may be the timbre code, number of channels available for simultaneous synthesizing, or the setup configured by the manual or compulsory mode, as in the second embodiment. For the tones allocated to the LSI sound source, vacant channels are prepared by the voice allocation process in step Sh3 as in step Se4 (FIG. 15). In step Sh4, the waveform relevant to the note-on event is synthesized through the vacant channels. The synthesizing method for this operation is not limited to the FM mode or the harmonics synthesizing method, but it is possible to use, for example, the physical modeling mode and the PCM mode to read out the wave data from the waveform memory 25 depending upon the characteristics of the installed sound source 22. On the other hand, for the tones allocated to the CPU, the CPU synthesizing allocation procedure is done in order to generate an allocation command relevant to the detected note-on event in step Sh5 as in step Se7 (FIG. 15). Information about the calculation method is included in the allocation command. The voice allocated to both of the CPU and the sound source is processed in steps Sh3 and step Sh4 by the LSI sound source, while the same voice is processed in steps Sh5 by the CPU. These processes are executed in parallel. If the allocation command is available, the detection in step Sh6 results in "Yes", and the synthesizing calculation in step Sh7 is executed to generate a waveform relevant to the allocation command. Unlike the second embodiment, the synthesizing calculation is done by various modes including the FM, harmonics synthesizing, physical modeling and so on. On the other hand, if the allocation command is not available, the detection in step Sh6 results in "No", and the procedure returns.

In the third embodiment, a voice (tone) can be allocated to both of the CPU and the LSI sound source so that different wave data can be reproduced for the same tone actually. Due to this feature, the third embodiment can also diversify the tones of the system. For summary, both of the first waveform generator and the second waveform generator are coincidently designated so that the controller device operates both of the first waveform generator and the second waveform generator to concurrently create waveforms in parallel manner for a single timbre.

A fourth embodiment will be explained hereunder. Even though the voice allocation mode is introduced in the embodiments described above, more simple implementation is possible. An event which can be allocated to a certain sound source device is simply allocated to the relevant device upon the event detection, provided that the device is installed in the system. The very implementation is provided in this fourth embodiment. The fourth embodiment assumes that the sound source 22 is installed as shown in FIG. 1 or 24, as in the second and third embodiments. With respect to the waveform synthesizing program, the synthesizing process using the selected hardware device (FIGS. 15 and 16) is replaced with the process shown in FIG. 20. More particularly, the synthesizing process using the selected hardware device in step Sa34 (FIG. 11) is substituted for the process shown in FIG. 20. The substituted process will be described hereunder, while omitting the explanation of the other processes for avoiding duplicated description.

Figure 20:
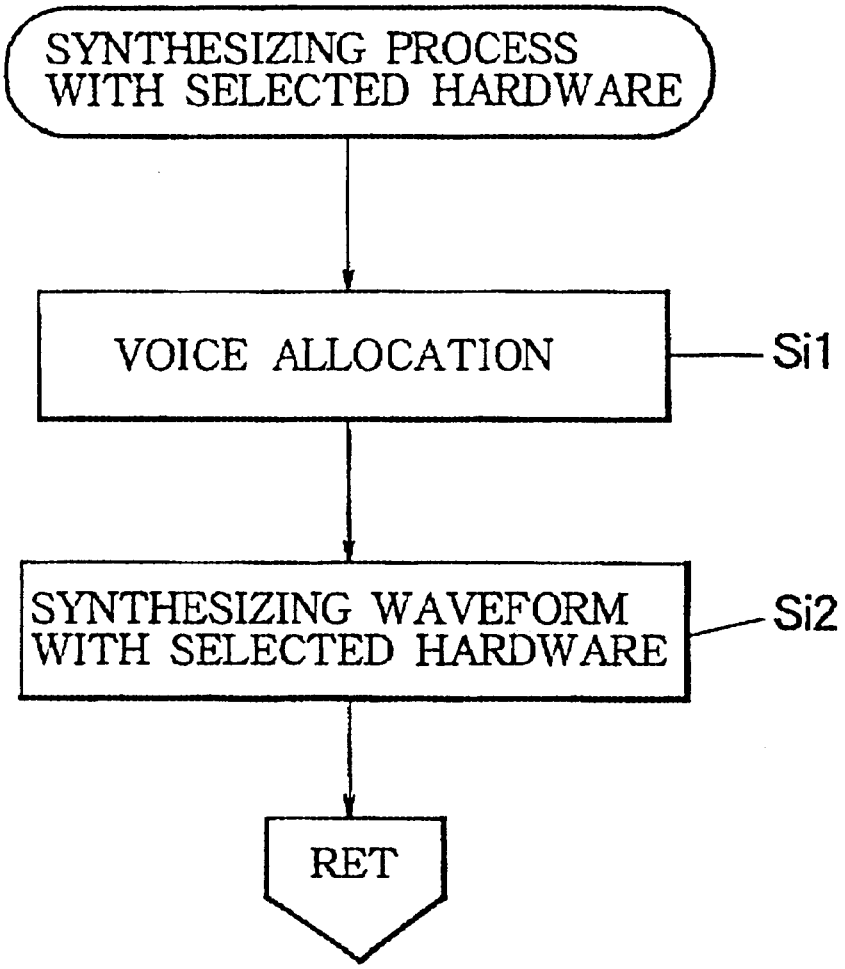
FIG. 20 is a flowchart illustrating a synthesizing process by a selected hardware in a fourth embodiment.

In this embodiment, upon advancing forward to step Sa34, the synthesizing program runs to execute the synthesizing process using the selected hardware as shown in FIG. 20. First of all, the event detection is carried out though this process is not illustrated. In step S11, voice allocation is executed to create vacant channel in the LSI sound source. In step Si2, the waveform relevant to the detected event is actually synthesized using the vacant channel. The synthesizing method for this operation is not limited to the FM mode or the harmonics synthesizing mode, but it is possible to use, for example, the physical modeling mode and the PCM mode to read out the wave data from the waveform memory 25 depending upon the characteristics of the installed sound source 22. After the synthesizing, the procedure returns. Thus, in the fourth embodiment, an event which can be allocated to a certain sound source device is simply allocated to this device upon the event detection provided that this device is installed in the system.

Figure 25:
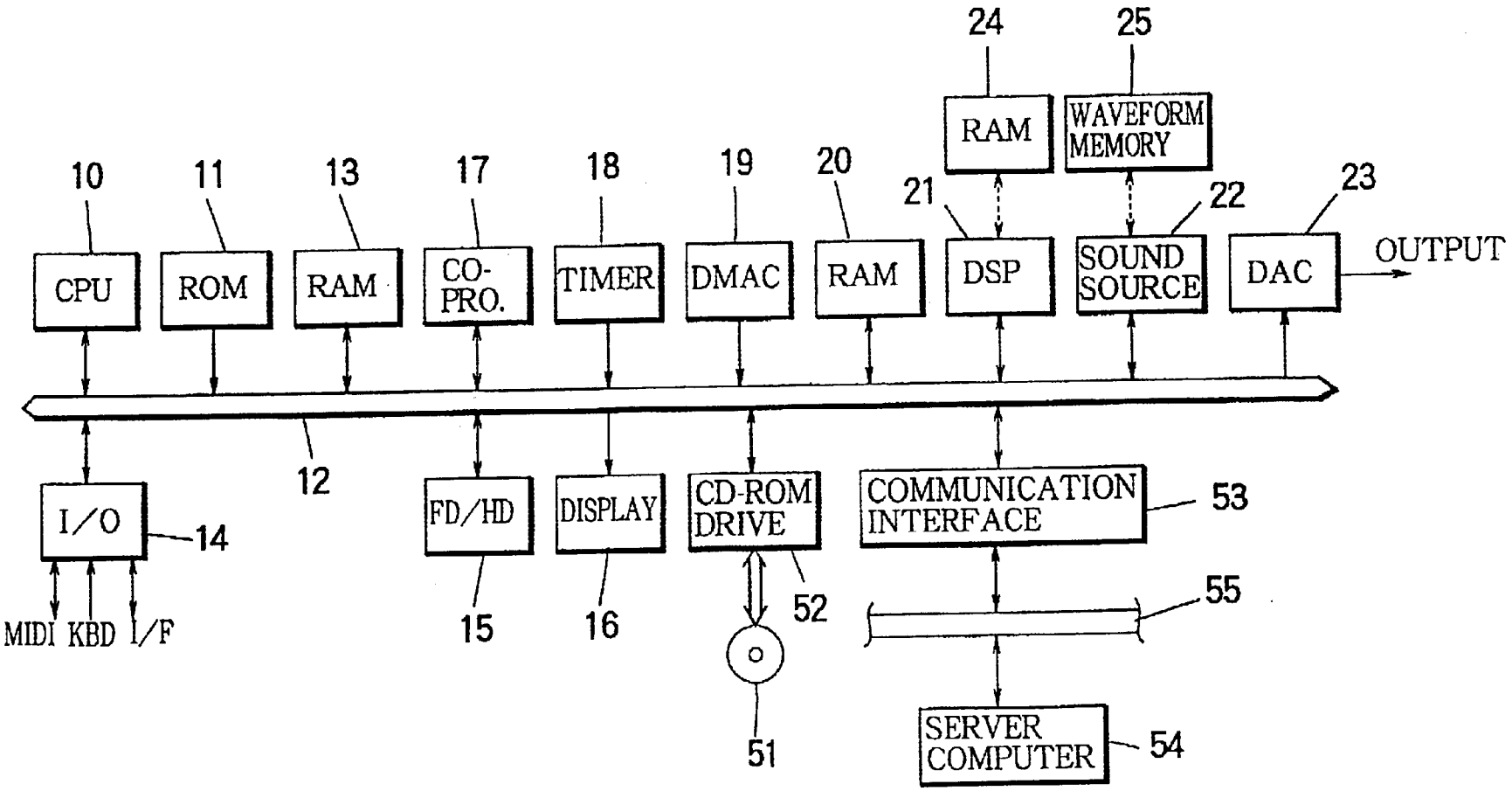
FIG. 25 is a schematic block diagram showing an additional embodiment of the inventive musical sound generating apparatus.

FIG. 25 shows an additional embodiment of the inventive musical sound generating apparatus. This embodiment has basically the same construction as the first embodiment shown in FIG. 1. The same components are denoted by the same references as those of the first embodiment to facilitate better understanding of the additional embodiment. The storage unit 15 can store various data such as waveform data and various programs including the system control program or basic program, the waveform synthesizing program and other application programs. Normally, the ROM 11 provisionally stores these programs. However, if not, any program may be loaded into a hard disk or else in the storage unit 15. The loaded program is transferred to the RAM 13 to enable the CPU 10 to operate the inventive system of the musical sound generating apparatus. By such a manner, new or version-up programs can be readily installed in the system. For this purpose, a machine-readable media such as a CD-ROM (Compact Disc Read Only Memory) 51 is utilized to install the program. The CD-ROM 51 is set into a CD-ROM drive 52 to read out and download the program from the CD-ROM 51 into the storage unit 15 through the bus 12. The machine-readable media may be composed of a magnetic disk or an optical disk other than the CD-ROM 51.

A communication interface 53 is connected to an external server computer 54 through a communication network 55 such as LAN (Local Area Network), public telephone network and INTERNET. If the storage unit 15 does not reserve needed data or program, the communication interface 53 is activated to receive the data or program from the server computer 54. The CPU 10 transmits a request to the server computer 54 thorough the interface 53 and the network 55. In response to the request, the server computer 54 transmits the requested data or program to the apparatus. The transmitted data or program is stored in the hard disk of the storage unit 15 to thereby complete the downloading.

The inventive musical sound generating apparatus can be implemented by a personal computer which is installed with the needed data and programs. In such a case, the data and programs are provided to the user by means of the machine-readable media such as the CD-ROM 51 or a floppy disk. The machine-readable media contains instructions for causing the personal computer to perform the inventive musical sound generating method as described in conjunction with the previous embodiments. Otherwise, the personal computer may receive the data and programs through the communication network 55.

In the embodiments described above, the optional devices including the co-processor 17, DSP 21, sound source 22 are referred to as examples, but the optional device is not limited to these devices. The present invention can be utilized in the application systems such as personal computer, electronic musical instrument, game machine and so on in which the musical sound is generated.

As shown in the foregoing, according to the present invention, various effects can be derived. It is possible to generate various musical sounds and to reduce a processing load required for musical sound generation. The musical sound can be generated at the optimum sample frequency for the configuration of the apparatus. The structure for generating the wave data of the musical sound can be significantly simplified. The quality of the generated musical sound can be retained even in low performance hardware. The musical sound can be generated according to the performance information even if the volume of the performance information becomes large.

What is claimed is:

1. A musical sound generating apparatus for creating a waveform to generate a musical sound according to performance information, comprising:

first waveform generator means operable for creating a waveform;

second waveform generator means operable independently from the first waveform generator means for creating a waveform;

input means for providing performance information;

designating means for designating at least one of the first waveform generator means and the second waveform generator means, in correspondence with the provided performance information;

controller means for selectively operating the designated one of the first waveform generator means and the second waveform generator means to create the waveform according to the provided performance information; and output means for generating the musical sound based on the created waveform, wherein the first waveform generator means comprises a hardware module driven by the controller means, while the second waveform generator means comprises a software module installable in the controller means.

2. A musical sound generating apparatus according to claim 1, wherein the input means comprises means for providing performance information which contains timbre information effective to specify a timbre of the musical sound and timing information effective to specify a timing of generation of the musical sound, and wherein the designating means comprises means for designating one of the first waveform generator means and the second waveform generator means in correspondence with the timbre information so that the output means generates the musical sound having the specified timber at the specified timing.

3. A musical sound generating apparatus according to claim 1, wherein the designating means includes means operable for coincidently designating both of the first waveform generator means and the second waveform generator means so that the controller means operates both of the first waveform generator means and the second waveform generator means to concurrently create waveforms in a parallel manner.

4. A musical sound generating apparatus according to claim 1, wherein the input means comprises means for providing performance information effective to command concurrent generation of a plurality of musical sounds, and wherein the designating means comprises means for designating one of the first waveform generator means and the second waveform generator means according to a number of concurrent musical sounds specified by the performance information such that the designated one has a capacity sufficient to create a number of waveforms corresponding to the number of the musical sounds.

5. A musical sound generating apparatus according to claim 4, wherein the designating means further comprises means operative when the number of the concurrent musical sounds exceeds a capacity of either of the first waveform generator means and the second waveform generator means for designating both of the first waveform generator means and the second waveform generator means to ensure complete generation of the concurrent musical sounds.

6. A musical sound generating apparatus according to claim 1, wherein the first waveform generator means comprises an external waveform generator optionally connectable to the controller means while the second waveform generator means comprises an internal waveform generator integrated with the controller means so that the designating means designates the internal waveform generator in place of the external waveform generator when the same is not connected to the controller means even though the external waveform generator should primarily correspond to the provided performance information.

7. A musical sound generating apparatus according to claim 1, wherein the second waveform generator means, the input means, the designating means and the controller means are integrated with each other to constitute a main part composed of a computer, while the first waveform generator means alone constitutes a supplementary part which is separate from the main part and which is optionally installable in the computer.

8. A musical sound generating apparatus according to claim 1, wherein the second waveform generator means comprises a plurality of digital waveform generators which are operable based on different algorithms to arithmetically create digital waveforms having different qualities, and wherein the controller means comprises means for selectively operating an optimal one of the digital waveform generators according to the provided performance information.

9. A musical sound generating apparatus according to claim 8, wherein the second waveform generator means includes a digital waveform generator of a waveform memory type operable based on a relatively simple algorithm to create a digital waveform having a relatively low quality, and another digital waveform generator operable based on a relatively complicated algorithm to create another digital waveform having a relatively high quality.

10. A musical sound generating apparatus according to claim 1, wherein the second waveform generator means comprises a computerized waveform generator operable according to a given algorithm at a variable operation speed to create a digital waveform by successively computing sample values of the digital waveform, and wherein the controller means comprises means for provisionally operating the computerized waveform generator to carry out trial creation of a model digital waveform while measuring the operation speed at which the trial creation is carried out, determining means for optionally determining a sampling frequency comparable to the measured operation speed, and means for actually operating the computerized waveform generator to enable the same to successively compute sample values of an actual digital waveform at the determined sampling frequency according to the provided performance information.

11. A musical sound generating apparatus according to claim 10, wherein the determining means comprises means for fixing the sampling frequency to one of stepwise predetermined levels, which is lower than and closest to the measured operation speed.

12. A musical sound generating apparatus according to claim 10, wherein the controller means further comprises changing means operative when the determined sampling frequency falls below a critical level which is defined to ensure a minimal quality of the digital waveform for changing the algorithm to raise the operation speed of the computerized waveform generator so that the sampling frequency can be redetermined to exceed the critical level.

13. A musical sound generating apparatus according to claim 12, wherein the changing means comprises means for changing the algorithm from a complicated one to a simplified one such that the computerized waveform generator operates based on the simplified one of the algorithms to successively read out prestored ones of sample values to reproductively create the digital waveform.

14. A musical sound generating apparatus according to claim 13, wherein the computerized waveform generator successively reads out prestored ones of sample values which are provisionally computed according to the complicated algorithm before the same is changed to the simplified algorithm.

15. A sound generating apparats for creating a digital waveform to generate a musical sound according to performance information, comprising:

input means for providing performance information;

computerized waveform generator means operable based on a given algorithm at a variable operation speed to create a digital waveform by successively computing sample values of the digital waveform;

trial means for provisionally operating the computerized waveform generator to carry out trial creation of a model digital waveform while measuring the operation speed at which the trial creation is carried out;

determining means for optimally determining a sampling frequency comparable to the measured operation speed;

controller means for actually operating the computerized waveform generator to enable the same to successively compute sample values of an actual digital waveform at the determined sampling frequency; and output means for generating the musical sound based on the actual digital waveform according to the provided performance information.

16. A musical sound generating method of creating a waveform to generate a musical sound according to performance information, comprising the steps of:

preparing a first waveform generator operable for creating a waveform;

preparing a second waveform generator operable independently from the first waveform generator for creating a waveform;

providing performance information;

designating at least one of the first waveform generator and the second waveform generator in correspondence with the provided performance information;

selectively operating the designated one of the first waveform generator and the second waveform generator by means of a controller to create the waveform according to the provided performance information; and generating the musical sound based on the created waveform, wherein the first waveform generator comprises a hardware module driven by the controller, while the second waveform generator comprises a software module installable in the controller.

17. A musical sound generating method according to claim 16, wherein the providing step comprises providing performance information which contains timbre information effective to specify a timbre of the musical sound and timing information effective to specify a timing of generation of the musical sound, and wherein the designating step comprises designating one of the first waveform generator and the second waveform generator in correspondence with the timbre information so that the musical sound having the specified timber is generated at the specified timing.

18. A musical sound generating method according to claim 16, wherein the designating step includes coincidently designating both of the first waveform generator and the second waveform generator so that the controller operates both of the first waveform generator and the second waveform generator to concurrently create waveforms in a parallel manner.

19. A musical sound generating method according to claim 16, wherein the providing step comprises providing performance information effective to command concurrent generation of a plurality of musical sounds, and wherein the designating step comprises designating one of the first waveform generator and the second waveform generator according to a number of concurrent musical sounds specified by the performance information such that the designated one has a capacity sufficient to create a number of waveforms corresponding to the number of the musical sounds.

20. A musical sound generating method according to claim 19, wherein the designating step further comprises designating both of the first waveform generator and the second waveform generator to ensure complete generation of the concurrent musical sounds when the number of the concurrent musical sounds exceeds a capacity of either of the first waveform generator and the second waveform generator.

21. A musical sound generating method according to claim 16, wherein the preparing steps comprise preparing the first waveform generator composed of an external waveform generator optionally connectable to the controller and the second waveform generator composed of an internal waveform generator integrated with the controller so that the internal waveform generator is designated in place of the external waveform generator when the same is not connected to the controller even though the external waveform generator should primarily correspond to the provided performance information.

22. A musical sound generating method according to claim 16, wherein the preparing step comprises preparing the second waveform generator composed of a plurality of digital waveform generators which are operable based on different algorithms to arithmetically create digital waveforms having different qualities, and wherein the operating step comprises selectively operating an optimal one of the digital waveform generators according to the provided performance information.

23. A musical sound generating method according to claim 22, wherein the preparing step comprises preparing the second waveform generator including a digital waveform generator of a waveform memory type operable based on a relatively simple algorithm to create a digital waveform having a relatively low quality, and another digital waveform generator operable based on a relatively complicated algorithm to create another digital waveform having a relatively high quality.

24. A musical sound generating method according to claim 16, wherein the preparing step comprises preparing the second waveform generator composed of a computerized waveform generator operable according to a given algorithm at a variable operation speed to create a digital waveform by successively computing sample values of the digital waveform, and wherein the operating step comprises steps of provisionally operating the computerized waveform generator to carry out trial creation of a model digital waveform while measuring the operation speed at which the trial creation is carried out, optimally determining a sampling frequency comparable to the measured operation speed, and actually operating the computerized waveform generator to enable the same to successively compute sample values of an actual digital waveform at the determined sampling frequency according to the provided performance information.

25. A musical sound generating method according to claim 24, wherein the determining step comprises fixing the sampling frequency to one of stepwise predetermined levels, which is lower than and closest to the measured operation speed.

26. A musical sound generating method according to claim 24, wherein the operating step further comprises changing the algorithm to raise the operation speed of the computerized waveform generator so that the sampling frequency can be redetermined to exceed the critical level when the determined sampling frequency falls below a critical level which is defined to ensure a minimal quality of the digital waveform.

27. A musical sound generating method according to claim 26, wherein the changing step comprises changing the algorithm from a complicated one to a simplified one such that the computerized waveform generator operates based on the simplified one of the algorithm to successively read out prestored ones of sample values to reproductively create the digital waveform.

28. A musical sound generating method according to claim 27, wherein the preparing step comprises preparing the computerized waveform generator which successively reads out prestored ones of sample values which are provisionally computed according to the complicated algorithm before the same is changed to the simplified algorithm.

29. A sound generating method of creating a digital waveform to generate a musical sound according to performance information the method, comprising the steps of:

providing performance information;

preparing a computerized waveform generator operable based on a given algorithm at a variable operation speed to create a digital waveform by successively computing sample values of the digital waveform;

provisionally operating the computerized waveform generator to carry out trial creation of a model digital waveform while measuring the operation speed at which the trial creation is carried out;

optimally determining a sampling frequency comparable to the measured operation speed;

actually operating the computerized waveform generator to enable the same to successively compute sample values of an actual digital waveform at the determined sampling frequency; and generating the musical sound based on the actual digital waveform according to the provided performance information.

30. A machine readable media containing instructions for causing said machine to perform a method of creating a waveform to generate a musical sound according to performance information, the method comprising the steps of:

preparing a first waveform generator operable for creating a waveform;

preparing a second waveform generator operable independently from the first waveform generator for creating a waveform;

providing performance information;

designating at least one of the first waveform generator and the second waveform generator in correspondence with the provided performance information;

selectively operating the designated one of the first waveform generator and the second waveform generator by means of a controller to create the waveform according to the provided performance information; and generating the musical sound based on the created waveform, wherein the first waveform generator comprises a hardware module driven by the controller, while the second waveform generator comprises a software module installable in the controller.

31. A machine readable media according to claim 30, wherein the providing step comprises providing performance information which contains timbre information effective to specify a timbre of the musical sound and timing information effective to specify a timing of generation of the musical sound, and wherein the designating step comprises designating one of the first waveform generator and the second waveform generator in correspondence with the timbre information so that the musical sound having the specified timber is generated at the specified timing.

32. A machine readable media according to claim 30, wherein the designating step includes coincidently designating both of the first waveform generator and the second waveform generator so that the controller operates both of the first waveform generator and the second waveform generator to concurrently create waveforms in a parallel manner.

33. A machine readable media according to claim 30, wherein the providing step comprises providing performance information effective to command concurrent generation of a plurality of musical sounds, and wherein the designating step comprises designating one of the first waveform generator and the second waveform generator according to a number of concurrent musical sounds specified by the performance information such that the designated one has a capacity sufficient to create a number of waveforms corresponding to the number of the musical sounds.

34. A machine readable media according to claim 33, wherein the designating step further comprises designating both of the first waveform generator and the second waveform generator to ensure complete generation of the concurrent musical sounds when the number of the concurrent musical sounds exceeds a capacity of either of the first waveform generator and the second waveform generator.

35. A machine readable media according to claim 30, wherein the preparing steps comprise preparing the first waveform generator composed of an external waveform generator optionally connectable to the controller and the second waveform generator composed of an internal waveform generator integrated with the controller so that the internal waveform generator is designated in place of the external waveform generator when the same is not connected to the controller even though the external waveform generator should primarily correspond to the provided performance information.

36. A machine readable media according to claim 30, wherein the preparing step comprises preparing the second waveform generator composed of a plurality of digital waveform generators which are operable based on different algorithms to arithmetically create digital waveforms having different qualities, and wherein the operating step comprises selectively operating an optimal one of the digital waveform generators according to the provided performance information.

37. A machine readable media according to claim 36, wherein the preparing step comprises preparing the second waveform generator including a digital waveform generator of a waveform memory type operable based on a relatively simple algorithm to create a digital waveform having a relatively low quality, and mother digital waveform generator operable based on a relatively complicated algorithm to create another digital waveform having a relatively high quality.

38. A machine readable media according to claim 30, wherein the preparing step comprises preparing the second waveform generator composed of a computerized waveform generator operable according to a given algorithm at a variable operation speed to create a digital waveform by successively computing sample values of the digital waveform, and wherein the operating step comprises steps of provisionally operating the computerized waveform generator to carry out trial creation of a model digital waveform while measuring the operation speed at which the trial creation is carried out, optionally determining a sampling frequency comparable to the measured operation speed, and actually operating the computerized waveform generator to enable the same to successively compute sample values of an actual digital waveform at the determined sampling frequency according to the provided performance information.

39. A machine readable media according to claim 38, wherein the determining step comprises fixing the sampling frequency to one of stepwise predetermined levels, which is lower than and closest to the measured operation speed.

40. A machine readable media according to claim 38, wherein the operating step further comprises changing the algorithm to raise the operation speed of the computerized waveform generator so that the sampling frequency can be redetermined to exceed the critical level when the determined sampling frequency falls below a critical level which is defined to ensure a minimal quality of the digital waveform.

41. A machine readable media according to claim 40, wherein the changing step comprises changing the algorithm from a complicated one to a simplified one such that the computerized waveform generator operates based on the simplified one of the algorithms to successively read out prestored ones of sample values to reproductively create the digital waveform.

42. A machine readable media according to claim 41, wherein the preparing step comprises preparing the computerized waveform generator which successively reads out prestored ones of sample values which are provisionally computed according to the complicated algorithm before the same is changed to the simplified algorithm.

43. A machine readable media containing instructions for causing said machine to perform a method of creating a digital waveform to generate a musical sound according to performance information, the method comprising the steps of:

providing performance information;

preparing a computerized waveform generator operable based on a given algorithm at a variable operation speed to create a digital waveform by successively computing simple values of the digital waveform;

provisionally operating the computerized waveform generator to carry out trial creation of a model digital waveform while measuring the operation speed at which the trial creation is carried out;

optimally determining a sampling frequency comparable to the measured operation speed;

actually operating the computerized waveform generator to enable the same to successively compute sample values of an actual digital waveform at the determined sampling frequency; and generating the musical sound based on the actual digital waveform according to the provided performance information.

*44. A music apparatus comprising:*

*a processor;*

*a first waveform generator comprising a hardware device driven by the processor;*

*a second waveform generator comprising a software program executed by the processor; and*

*a program memory storing instructions for causing the processor to execute a musical sound generating process according to performance information, the musical sound generating process comprising the steps of:*

*preparing the first waveform generator operable for creating a waveform;*

*preparing the second waveform generator operable independently from the first waveform generator for creating a waveform;*

*receiving the performance information;*

*designating at least one of the first waveform generator and the second waveform generator;*

*selectively operating the designated one of the first waveform generator and the second waveform generator to create the waveform according to the received performance information; and*

*generating a musical sound based on the created waveform.*

*45. The music apparatus according to claim 44, further comprising a sequencer comprising an automatic performance program executable by the processor, and wherein the step of receiving comprises receiving the performance information provided automatically from the sequencer.*

*46. The music apparatus according to claim 44, wherein the step of receiving comprises receiving the performance information from an interface connectable, under control by the processor, to an external source of the performance information.*

*47. The music apparatus according to claim 44, wherein the step of receiving comprises receiving the performance information from an input-device, the input-device being manually playable to provide the performance information.*

*48. The music apparatus according to claim 44, wherein the step of receiving comprises retrieving the performance information from a storage medium storing the performance information.*

*49. The music apparatus according to claim 44, wherein the step of designating comprises designating at least one of the first waveform generator and the second waveform generator in correspondence with the received performance information.*

*50. The music apparatus according to claim 44, wherein the step of designating comprises designating at least one of the first waveform generator and the second waveform generator according to an operating speed of the processor available for executing the musical sound generating process.*

*51. The music apparatus according to claim 44, wherein the step of designating comprises designating at least one of the first waveform generator and the second waveform generator according to a channel capacity of the processor available for executing the musical sound generating process.*

*52. The music apparatus according to claim 44, wherein the step of preparing comprises preparing a plurality of second waveform generators in the form of a plurality of software programs corresponding to different modes of the musical sound generating process such that the step of designating can selectively designate one of the second waveform generators.*

*53. The music apparatus according to claim 44 wherein the hardware device comprises a digital signal processor that executes a microprogram under control of the processor for processing the performance information to create the waveform.*

*54. The music apparatus according to claim 44, wherein the hardware device comprises a large-scale integrated circuit that receives the performance information through the processor to create the waveform.*

*55. The music apparatus according to claim 44, wherein the hardware device comprises a large scale integrated circuit including at least a sound source device that receives the performance information through the processor to create the waveform and a digital-to-analog converter that converts the created waveform into a corresponding analog signal of the musical sound.*

*56. The music apparatus according to claim 44, wherein the hardware device comprises a remote sound source system that receives the performance information from the processor and returns the created waveform to the processor.*

*57. A music apparatus comprising:*

*a computer having a processor and a program memory storing instructions for causing the processor to execute a process of creating a digital waveform to generate a musical sound according to performance information, the process comprising the steps of:*

*receiving the performance information;*

*preparing a computerized waveform generator operable, based on a given algorithm, at a variable operation speed to create a digital waveform by successively computing sample values of the digital waveform;*

*provisionally operating the computerized waveform generator to carry out trial creation of a model digital waveform while measuring the operation speed at which the trial creation is carried out;*

*optimally determining a sampling frequency comparable to the measured operation speed;*

*operating the computerized waveform generator to successively compute sample values of an actual digital waveform at the determined sampling frequency; and*

*generating the musical sound based on the actual digital waveform according to the received performance information.*

*58. A music apparatus comprising:*

*a central processor;*

*a first waveform generator comprising a hardware device driven by the central processor;*

*a second waveform generator comprising a software program executed by the central processor;*

*a digital-to-analog converter provided commonly for both of the first waveform generator and the second waveform generator; and*

*a program memory storing instructions for causing the central processor to execute a musical sound generating process according to performance information, the musical sound generating process comprising the steps of:*

*preparing the first waveform generator operable for creating a digital waveform;*

*preparing the second waveform generator operable independently from the first waveform generator for creating a digital waveform;*

*receiving the performance information;*

*operating either of the first waveform generator and the second waveform generator to create the digital waveform according to the received performance information; and*

*operating the digital-to-analog converter to convert the digital waveform created by either of the first waveform generator and the second waveform generator into a corresponding analog signal of a musical sound.*

*59. A music apparatus comprising:*

*a central processor;*

*first and second waveform generators;*

*a program memory storing instructions for causing the central processor to execute a musical sound generating process according to performance information, the musical sound generating process comprising the steps of:*

*preparing the first waveform generator operable for creating a waveform;*

*preparing the second waveform generator operable in addition to the first waveform generator for creating a waveform;*

*receiving the performance information;*

*designating the first waveform generator, in precedence to the second waveform generator, when the first waveform generator is sufficient to process the received performance information and designating the second waveform generator when the first waveform generator is insufficient to process the received performance information;*

*operating the first waveform generator to create the waveform and, when the second waveform generator is designated, additionally operating the second waveform generator to create the waveform according to the received performance information; and*

*generating a musical sound based on the created waveform.*

*60. The music apparatus according to claim 59, wherein the step of receiving comprises receiving the performance information for a plurality of concurrent musical sounds, and wherein the step of designating comprises designating the first waveform generator to create a number of waveforms corresponding to the concurrent musical sounds specified by the performance information, and when the number of the waveforms exceeds the capacity of the first waveform generator, further designating the second waveform generator to create the remaining waveforms, thereby ensuring complete generation of the concurrent musical sounds by both of the first waveform generator and the second waveform generator.*

*61. The music apparatus according to claim 59, wherein the first waveform generator includes a hardware device driven by the central processor and the second waveform generator includes a software program executable by the central processor, and wherein the step of designating comprises designating the second waveform generator when an operating speed of the central processor allows execution of the software program.*

*62. The music apparatus according to claim 59, wherein the first waveform generator includes a hardware device driven by the central processor and the second waveform generator includes a software program executable by the central processor, and wherein the step of designating comprises designating the second waveform generator when a channel capacity of the central processor allows execution of the software program.*

*63. The music apparatus according to claim 59, wherein at least one of the first waveform generator and the second waveform generator comprises a software program executed by the central processor.*

*64. The music apparatus according to claim 63, wherein the other of the first waveform generator and the second waveform generator comprises a hardware device driven by the central processor.*

*65. A music apparatus comprising:*

*a central processor;*

*a program memory storing instructions for causing the central processor to execute a process of generating a musical sound according to performance information, wherein the process comprises the steps of:*

*detecting whether a first waveform generator, comprised of a hardware device selectively connected with and driven by the central processor for creating a waveform, is connected with the central processor,*

*preparing a second waveform generator comprised of a software program executable by the central processor for creating a waveform;*

*receiving the performance information;*

*designating either of the first waveform generator and the second waveform generator when the first waveform generator is detected to be connected with the central processor, and otherwise designating the second waveform generator when the first waveform generator is not detected to be connected with the central processor;*

*selectively operating the designated one of the first waveform generator and the second waveform generator to create the waveform according to the received performance information; and*

*generating the musical sound based on the created waveform.*

*66. The music apparatus according to claim 65, wherein the step of designating comprises designating the first waveform generator in precedence to the second waveform generator when the first waveform generator is detected to be connected to the central processor.*

*67. The music apparatus according to claim 66, wherein the step of a designating comprises further designating the second waveform generator when the first waveform generator is insufficient to process the received performance information.*

*68. The music apparatus according to claim 65, wherein the step of designating comprises designating the second waveform generator in precedent to the first waveform generator when the first waveform generator is detected to be connected to the central processor.*

*69. A music apparatus comprising:*

*a central processor;*

*a program memory storing instructions for causing the central processor to execute a process of generating a musical sound according to performance information, wherein the process comprises the steps of:*

*preparing a first waveform generator comprised of a first software program executable by the central processor for creating a waveform, and preparing a second waveform generator comprised of a second software program executable by the central processor for creating a substitute waveform which is substitutable for the waveform created by the first waveform generator;*

*receiving the performance information;*

*designating primarily the first waveform generator, and otherwise designating the second waveform generator in place of the first waveform generator when the central processor is unable to operate the first waveform generator;*

*operating the second waveform generator when the second waveform generator is designated to create the substitute waveform according to the received performance information; and*

*generating the musical sound based on the created substitute waveform when the central processor is unable to operate the first waveform generator.*

*70. The music apparatus according to claim 69, wherein the first waveform generator requires a predetermined computation capacity of the central processor, and the second waveform generator requires a computation capacity less than the predetermined computation capacity, and wherein the step of designating comprises designating the second waveform generator in place of the first waveform generator when the central processor cannot provide the predetermined computation capacity required for operation of the first waveform generator.*

*71. The music apparatus according to claim 69, wherein the step of operating comprises provisionally operating the first waveform generator for creating a source waveform even though the first waveform generator is not designated, and then operating the second waveform generator to create the substitute waveform by using the source waveform.*

*72. The music apparatus according to claim 68, wherein the step of designating comprises designating primarily the first waveform generator in correspondence with the received performance information.*

*73. The music apparatus according to claim 68, wherein the step of designating comprises designating primarily the first waveform generator according to a computation capacity of the central processor available for executing the musical sound generating process.*

*74. A music apparatus comprising:*

*a central processor;*

*a program memory storing instructions for causing the central processor to execute a process of creating a digital waveform to generate a musical sound according to performance information, wherein the process comprises the steps of:*

*receiving the performance information;*

*preparing a waveform generator composed of a software program executable by the central processor in a variable operation mode to create a digital waveform, the variable operation mode depending on a computation capacity of the central processor;*

*detecting the computation capacity available for operation of the waveform generator;*

*optimally changing the variable operation mode of the waveform generator according to the detected computation capacity of the central processor;*

*operating the waveform generator in the variable operation mode as optimally changed to create the digital waveform according to the received performance information; and*

*generating the musical sound based on the created digital waveform.*

*75. The music apparatus according to claim 74, wherein the waveform generator is operable according to the software program at a variable operation speed to create a digital waveform by successively computing sample values of the digital waveform, wherein the step of detecting comprises provisionally operating the waveform generator to carry out trial creation of a model digital waveform while measuring the computation capacity of the central processor in terms of the operation speed at which the trail creation is carried out, wherein the step of optimally changing comprises optimally determining the variable operation mode in terms of a sampling frequency comparable to the measured operation speed, and wherein the step of operating comprises operating the waveform generator to successively compute sample values of the digital waveform at the determined sampling frequency.*

*76. The music apparatus according to claim 74, wherein the step of detecting comprises detecting whether an additional processor is available to assist the central processor in computation for executing the software program.*

*77. The music apparatus according to claim 76, wherein the additional processor comprises a co-processor of the central processor.*

*78. The music apparatus according to claim 74, wherein the step of detecting comprises provisionally measuring the computation capacity of the central processor before the central processor executes the software program to operate the waveform generator.*

*79. The music apparatus according to claim 74, wherein the step of optimally changing comprises changing the variable operation mode such that a first algorithm, defining a method of creating the digital waveform is changed to a second algorithm when the detected computation capacity of the central processor decreases below a certain capacity level, the second algorithm being simpler than the first algorithm, thereby allowing the waveform generator to create the digital waveform at the decreased computation capacity.*

*80. The music apparatus according to claim 74, wherein the step of optimally changing comprises changing the variable operation mode such that a first operation speed of the waveform generator is changed to a second operation speed slower than the first operation speed when the detected computation capacity of the central processor decreases below a certain capacity level.*

*81. The music apparatus according to claim 74, wherein the step of optimally changing comprises changing the variable operation mode such that a set of computation steps performed by the central processor to create the digital waveform is changed according to the detected computation capacity of the central processor.*

*82. A music apparatus comprising:*

*a processor;*

*a first waveform generator comprising a hardware device driven by the processor;*

*a second waveform generator comprising a software program executed by the processor; and*

*a program memory storing instructions for causing the processor to execute a musical sound generating process according to performance information, the musical sound generating process comprising the steps of:*

*preparing the first waveform generator operable for creating a waveform;*

*preparing the second waveform generator operable independently from the first waveform generator for creating a waveform;*

*receiving the performance information;*

*designating at least one of the first waveform generator and the second waveform generator to an operating*

*state based on an operating speed of the processor available for executing the process of generating the musical sound;*

*selectively operating the designated one of the first waveform generator and the second waveform generator to create the waveform according to the received performance information; and*

*generating the musical sound based on the crated waveform.*

*83. A music apparatus comprising:*

*a processor;*

*a first waveform generator comprising a hardware device driven by the processor;*

*a second waveform generator comprising a software program executed by the processor; and*

*a program memory storing instructions for causing the processor to execute a musical sound generating process according to performance information, the musical sound generating process comprising the steps of:*

*preparing the first waveform generator operable for creating a waveform;*

*preparing the second waveform generator operable independently from the first waveform generator for creating a waveform;*

*receiving the performance information;*

*designating at least one of the first waveform generator and the second waveform generator to an operating state based on a channel capacity of the processor available for executing the process of generating the musical sound;*

*selectively operating the designated one of the first waveform generator and the second waveform generator to create the waveform according to the received performance information; and*

*generating the musical sound based on the created waveform.*

*84. A music apparatus comprising:*

*a processor;*

*a first waveform generator comprising a hardware device driven by the processor;*

*a second waveform generator comprising a software program executed by the processor; and*

*a program memory storing instructions for causing the processor to execute a musical sound generating process according to performance information, the musical sound generating process comprising the steps of:*

*preparing the first waveform generator operable for creating a waveform;*

*preparing the second waveform generator operable independently from the first waveform generator for creating a waveform;*

*receiving the performance information;*

*setting a plurality of assignment modes to determine different assignments of the received performance information to the first waveform generator and the second waveform generator;*

*manually selecting one of the assignment modes to assign the received performance information to at least one of the first waveform generator and the second waveform generator according to the selected assignment mode so as to create the waveform; and*

*generating the musical sound based on the created waveform.*

*85. The music apparatus according to claim 84, wherein the step of setting comprises setting a first assignment mode to assign the received performance information primarily to the first waveform generator and secondarily to the second waveform generator, and a second assignment mode to assign the received performance information primarily to the second waveform generator and secondarily to the first waveform generator.*

*86. A music apparatus comprising:*

*a computer having a processor and a program memory storing instructions for causing the processor to execute a process of creating a digital waveform to generate a musical sound according to performance information, the process comprising the steps of:*

*receiving the performance information;*

*preparing a computerized waveform generator operable, based on a given algorithm, at a variable sampling frequency to create a digital waveform by successively computing sample values of the digital waveform;*

*designating a value of the variable sampling frequency according to a computation capacity of the computer available for generating the musical sound;*

*operating the computerized waveform generator to successively compute the sample values of the digital waveform at the designated value of the variable sampling frequency; and*

*generating the musical sound based on the digital waveform according to the received performance information.*

*87. The music apparatus according to claim 86, wherein the computation capacity of the computer is measured by provisionally operating the computerized waveform generator to carry out a trial creation of a model digital waveform while measuring the operation speed at which the trial creation is carried out.*

*88. A method of generating a musical sound by a computer according to performance information, comprising the steps of:*

*preparing a first waveform generator operable for creating a digital waveform;*

*preparing a second waveform generator operable independently from the first waveform generator for creating a digital waveform;*

*providing the performance information;*

*operating either of the first waveform generator and the second waveform generator to create the digital waveform according to the provided performance information, wherein the first waveform generator comprises a hardware device driven by the computer and the second waveform generator comprises a software program executed by the computer; and*

*operating a digital-to-analog converter, provided commonly for both of the first waveform generator and the second waveform generator, to convert the digital waveform created by either of the first waveform generator and the second waveform generator into a corresponding analog signal of the musical sound.*

*89. A method of generating a musical sound according to performance information, comprising the steps of:*

*preparing a first waveform generator operable for creating a waveform;*

*preparing a second waveform generator operable in addition to the first waveform generator for creating a waveform;*

*providing the performance information;*

*designating the first waveform generator in precedence to the second waveform generator, and designating the second waveform generator when the first waveform generator is insufficient to process the provided performance information;*

*operating the first waveform generator to create the waveform and, when the second waveform generator is designated, additionally operating the second waveform generator to create the waveform according to the provided performance information; and*

*generating the musical sound based on the created waveform.*

*90. A method of generating a musical sound according to claim 89, wherein at least one of the first waveform generator and the second waveform generator comprises a software program executed by the central processor.*

*91. A method of generating a musical sound by a computer according to performance information, comprising the steps of:*

*detecting a first waveform generator comprised of a hardware device that is optionally connectable with and driven by the computer for creating a waveform;*

*preparing a second waveform generator comprised of a software program executable by the computer for creating a waveform;*

*providing the performance information;*

*designating either of the first waveform generator and the second waveform generator when the first waveform generator is detected to be connected with the computer, and otherwise designating the second waveform generator when the first waveform generator is not detected to be connected with the computer;*

*selectively operating the designated one of the first waveform generator and the second waveform generator to create the waveform according to the provided performance information; and*

*generating the musical sound based on the created waveform.*

*92. A method of generating a musical sound by a computer according to performance information, comprising the steps of:*

*preparing a first waveform generator comprised of a first software program executable by the computer for creating a waveform, and preparing a second waveform generator comprised of a second software program executable by the computer for creating a substitute waveform which is substitutable for the waveform created by the first waveform generator;* providing the performance information;

*designating the first waveform generator, and otherwise designating the second waveform generator in place of the first waveform generator when the computer is unable to operate the first waveform generator;*

*operating the second waveform generator when the second waveform generator is designated to create the substitute waveform according to the provided performance information; and*

*generating the musical sound based on the created substitute waveform even when the computer is unable to operate the first waveform generator.*

*93. A method of generating a musical sound by a computer according to performance information, comprising the steps of:*

*providing the performance information;*

*preparing a waveform generator comprising a software program executable by the computer in a variable operation mode to create a digital waveform, the variable operation mode being dependent on a computation capacity of the computer;*

*detecting the computation capacity available for operation of the waveform generator;*

*optimally changing the variable operation mode of the waveform generator according to the detected computation capacity of the computer;*

*operating the waveform generator in the variable operation mode as optimally changed to create the digital waveform according to the provided performance information; and*

*generating the musical sound based on the created digital waveform.*

*94. A method of generating a musical sound by a computer according to performance information, comprising the steps of:*

*providing the performance information;*

*preparing a computerized waveform generator operable, based on a given algorithm, at a variable sampling frequency to create a digital waveform by successively computing sample values of the digital waveform;*

*designating a value of the variable sampling frequency according to a computation capacity of the computer available for generating the musical sound;*

*operating the computerized waveform generator to successively compute the sample values of the digital waveform at the designated value of the variable sampling frequency; and*

*generating the musical sound based on the digital waveform according to the received performance information.*

*95. A machine-readable recording medium for use in a music apparatus having a central processing unit for generating a musical sound according to performance information, the medium including instructions executable by the central processing unit for causing the music apparatus to perform a method comprising the steps of:*

*preparing a first waveform generator operable for creating a digital waveform;*

*preparing a second waveform generator operable independently from the first waveform generator for creating a digital waveform;*

*receiving the performance information;*

*operating either of the first waveform generator and the second waveform generator to create the digital waveform according to the received performance information, wherein the first waveform generator comprises a hardware device driven by the central processing unit and the second waveform generator comprises a software program executed by the central processing unit; and*

*operating a digital-to-analog converter, provided commonly for both of the first waveform generator and the second waveform generator, to convert the digital waveform created by either of the first waveform generator and the second waveform generator into a corresponding analog signal of the musical sound.*

*96. A machine-readable recording medium for use in a music apparatus having a central processing unit for generating a musical sound according to performance information, the medium containing instructions executable by the central processing unit for causing the music apparatus to perform a method comprising the steps of:*

*preparing a first waveform generator operable for creating a waveform;*

*preparing a second waveform generator operable in addition to the first waveform generator for creating a waveform;*

*receiving the performance information;*

*designating the first waveform generator in precedence to the second waveform generator, and designating the second waveform generator when the first waveform generator is insufficient to process the received performance information;*

*operating the first waveform generator to create the waveform and, when the second waveform generator is designated, operating the second waveform generator to create the waveform according to the received performance information; and*

*generating the musical sound based on the created waveform.*

*97. A machine-readable recording medium for use in a music apparatus having a central processing unit for generating a musical sound according to performance information, the medium containing instructions executable by the central processing unit for causing the music apparatus to perform a method comprising the steps of:*

*detecting a first waveform generator comprised of a hardware device that is optionally connectable with and driven by the central processing unit for creating a waveform;*

*preparing a second waveform generator comprised of a software program executable by the central processing unit for creating a waveform;*

*receiving the performance information;*

*designating either of the first waveform generator and the second waveform generator when the first waveform generator is detected to be connected with the central processing unit, and otherwise designating the second waveform generator when the first waveform generator is not detected to be connected with the central processing unit;*

*operating the designated one of the first waveform generator and the second waveform generator to create the waveform according to the received performance information; and*

*generating the musical sound based on the created waveform.*

*98. A machine-readable recording medium for use in a music apparatus having a central processing unit for generating a musical sound according to performance information, the medium containing instructions executable by the central processing unit for causing the music apparatus to perform a method comprising the steps of:*

*preparing a first waveform generator comprised of a first software program executable by the central processing unit for creating a waveform and preparing a second waveform generator comprised of a second software program executable by the central processing unit for creating a substitute waveform which is substitutable for the waveform created by the first waveform generator;*

*receiving the performance information;*

*designating primarily the first waveform generator, and otherwise designating the second waveform generator in place of the first waveform generator when the central processing unit is unable to operate the first waveform generator;*

*operating the second waveform generator when the second waveform generator is designated to create the substitute waveform according to the received performance information; and*

*generating the musical sound based on the created substitute waveform even when the central processing unit is unable to operate the first waveform generator.*

*99. A machine-readable recording medium for use in a music apparatus having a central processing unit for generating a musical sound according to performance information, the medium containing instructions executable by the central processing unit for causing the music apparatus to perform a method comprising the steps of:*

*receiving the performance information;*

*preparing a waveform generator composed of a software program executable by the central processing unit in a variable operation mode to create a digital waveform, the variable operation mode depending on a computation capacity of the central processing unit;*

*detecting the computation capacity available for operation of the waveform generator;*

*optimally changing the variable operation mode of the waveform generator according to the detected computation capacity of the central processing unit;*

*operating the waveform generator in the variable operation mode as optimally changed to create the digital waveform according to the received performance information; and*

*generating the musical sound based on the created digital waveform.*

*100. A machine-readable recording medium for use in a music apparatus having a central processing unit for generating a musical sound according to performance information, the medium containing instructions executable by the central processing unit for causing the music apparatus to perform a method comprising the steps of:*

*receiving the performance information;*

*preparing a computerized waveform generator operable, based on a given algorithm, at a variable sampling frequency to create a digital waveform by successively computing sample values of the digital waveform;*

*designating a value of the variable sampling frequency according to a computation capacity of the computer available for generating the musical sound;*

*operating the computerized waveform generator to successively compute the sample values of the digital waveform at the designated value of the variable sampling frequency; and*

*generating the musical sound based on the digital waveform according to the received performance information.*

*101. A music apparatus for generating a musical sound according to performance information comprising:*

*a first waveform generator operable for creating a digital waveform;*

*a second waveform generator operable independently from the first waveform generator for creating a digital waveform;*

*means for providing the performance information;*

*means for operating either of the first waveform generator and the second waveform generator to create the digital waveform according to the provided performance information, wherein the first waveform generator comprises a hardware device and the second waveform generator comprises a software program; and*

*means provided commonly for both of the first waveform generator and the second waveform generator for*

*converting the digital waveform created by either of the first waveform generator and the second waveform generator into a corresponding analog signal of the musical sound.*

*102. A music apparatus for generating a musical sound according to performance information comprising:*

*a first waveform generator operable for creating a waveform;*

*a second waveform generator operable in addition to the first waveform generator for creating a waveform;*

*means for providing the performance information;*

*means for designating the first waveform generator in precedence to the second waveform generator, and designating the second waveform generator when the first waveform generator is insufficient to process the provided performance information;*

*means for operating the first waveform generator to create the waveform and, when the second waveform generator is designated, additionally operating the second waveform generator to create the waveform according to the provided performance information; and*

*means for generating the musical sound based on the created waveform.*

*103. A music apparatus according to claim 102, wherein at least one of the first waveform generator and the second waveform generator comprises a software program.*

*104. A music apparatus for generating a musical sound according to performance information comprising:*

*a processor;*

*a first waveform generator comprised of a hardware device that is optionally connectable to and driven by the processor for creating a waveform;*

*means for determining whether the first waveform generator is connected to the processor;*

*a second waveform generator comprised of a software program executable by the processor for creating a waveform;*

*means for providing the performance information;*

*means for designating either the first waveform generator or the second waveform generator when the first waveform generator is determined to be connected with the processor, otherwise designating the second waveform generator when the first waveform generator is not determined to be connected with the processor;*

*wherein the processor selectively operates the designated one of the first waveform generator and the second waveform generator to create the waveform according to the provided performance information; and*

*means for generating the musical sound based on the created waveform.*

*105. A music apparatus for generating a musical sound according to performance information comprising:*

*a processor;*

*a first waveform generator comprised of a first software program executable by the processor for creating a waveform;*

*a second waveform generator comprised of a second software program executable by the processor for creating a substitute waveform which is substitutable for the waveform created by the first waveform generator;*

*means for providing the performance information;*

*means for designating the first waveform generator, and otherwise designating the second waveform generator in place of the first waveform generator when the processor is unable to operate the first waveform generator;*

*wherein the processor operates the second waveform generator when the second waveform generator is designated to create the substitute waveform according to the provided performance information; and*

*means for generating the musical sound based on the created substitute waveform even when the processor is unable to operate the first waveform generator.*

*106. A music apparatus for generating a musical sound according to performance information comprising:*

*a processor;*

*means for providing the performance information;*

*a waveform generator comprising a software program executable by the processor in a variable operation mode to create a digital waveform, the variable operation mode being dependent on a computation capacity of the processor;*

*means for detecting the computation capacity available for operation of the waveform generator;*

*means for optimally changing the variable operation mode of the waveform generator according to the detected computation capacity of the processor;*

*wherein the processor operates the waveform generator in the variable operation mode as optimally changed to create the digital waveform according to the provided performance information; and*

*means for generating the musical sound based on the created digital waveform.*

*107. A music apparatus for generating a musical sound according to performance information comprising:*

*means for providing the performance information;*

*a computerized waveform generator operable, based on a given algorithm, at a variable sampling frequency to create a digital waveform by successively computing sample values of the digital waveform;*

*means for designating a value of the variable sampling frequency according to a computation capacity of the computer available for generating the musical sound;*

*means for operating the computerized waveform generator to successively compute the sample values of the digital waveform all the designated value of the variable sampling frequency; and*

*means for generating the musical sound based on the digital waveform according to the received performance information.*

* * * * *